(12) United States Patent
Kunitomo

(10) Patent No.: US 10,948,974 B2
(45) Date of Patent: Mar. 16, 2021

(54) HEAD-MOUNTED DISPLAY DEVICE, PROGRAM, AND METHOD FOR CONTROLLING HEAD-MOUNTED DISPLAY DEVICE

(71) Applicant: SEIKO EPSON CORPORATION, Tokyo (JP)

(72) Inventor: Yuichi Kunitomo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 136 days.

(21) Appl. No.: 15/899,395

(22) Filed: Feb. 20, 2018

(65) Prior Publication Data
US 2018/0246563 A1 Aug. 30, 2018

(30) Foreign Application Priority Data
Feb. 28, 2017 (JP) .............................. JP2017-035981

(51) Int. Cl.
*G06F 3/01* (2006.01)
*G06F 3/0481* (2013.01)
*G02B 27/01* (2006.01)

(52) U.S. Cl.
CPC ............ *G06F 3/011* (2013.01); *G02B 27/017* (2013.01); *G02B 27/0172* (2013.01); *G06F 3/04812* (2013.01); *G02B 2027/0138* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 2012/0068913 A1* | 3/2012 | Bar-Zeev | G02B 26/026 345/8 |
| 2013/0278493 A1* | 10/2013 | Wei | G06K 9/00355 345/156 |
| 2014/0225918 A1* | 8/2014 | Mittal | G06F 3/017 345/633 |
| 2015/0123895 A1 | 5/2015 | Takano | |
| 2015/0309629 A1* | 10/2015 | Amariutei | G06F 3/017 345/173 |

FOREIGN PATENT DOCUMENTS

| | | |
|---|---|---|
| JP | 2001-312356 A | 11/2001 |
| JP | 2006-155244 A | 6/2006 |
| JP | 2015-090530 A | 5/2015 |
| JP | 2016-177658 A | 10/2016 |

* cited by examiner

*Primary Examiner* — Matthew Yeung
(74) *Attorney, Agent, or Firm* — Oliff PLC

(57) ABSTRACT

A head-mounted display device includes: an image display unit which is mounted on a head of a user and displays an image in such a way that the user can visually recognize an external scene; a camera; a detection control unit which detects an operation with a pointing element, based on a picked-up image picked up by the camera; and an operation control unit which controls the image on the image display unit, based on the operation detected by the detection control unit. If the pointing element is detected from the picked-up image picked up by the camera, the operation control unit causes the image display unit to display a hand-finger image showing at least one of position and shape of the pointing element.

13 Claims, 14 Drawing Sheets

HEAD-MOUNTED DISPLAY DEVICE, PROGRAM, AND METHOD FOR CONTROLLING HEAD-MOUNTED DISPLAY DEVICE

BACKGROUND

1. Technical Field

The present invention relates to a head-mounted display device, a program, and a method for controlling a head-mounted display device.

2. Related Art

According to the related art, a head-mounted display device is referred to as HMD and enables the user wearing the HMD to visually recognize an image. The user carries out work while visually recognizing an image displayed by the HMD and thus can efficiently proceed with the work. The HMD is operated mainly using a controller. However, it is inconvenient to operate the controller every time the user operates the HMD. Thus, an HMD that enables input of information by intuitive operation is proposed (see, for example, JP-A-2001-312356).

JP-A-2001-312356 discloses a wearable computer integrated in an eyeglasses-type see-through display. With this wearable computer, the user wearing the see-though display device calls an input screen by presenting an open hand in front of his/her eyes, and selects a menu by pointing with the other hand or bending a finger of the open hand.

However, the see-through HMD superimposes an image on an external field visually recognized through the display unit, and if the image light is more intense than the external field light, the external field may be blocked by the image light and the visibility of the external field may drop. To cope with this, measures such as displaying the image in an area avoiding the hand of the user or reducing the luminance of the image light to be lower than the luminance of the external field light are conceivable. However, the user may find it troublesome if the display position of the image is changed or the quantity of light of the image light is changed every time the HMD is operated.

SUMMARY

An advantage of some aspects of the invention is that the user is allowed to recognize the state of a pointing element while the visibility of an image is maintained.

An aspect of the invention is directed to a head-mounted display device including: a display unit which is mounted on a head of a user and displays an image in such a way that the user can visually recognize an external scene; an image pickup unit; an operation detection unit which detects an operation with a pointing element, based on a picked-up image picked up by the image pickup unit; and a control unit which controls the image on the display unit, based on the operation detected by the operation detection unit. If the pointing element is detected by the operation detection unit from the picked-up image picked up by the image pickup unit, the control unit causes the display unit to display a display object showing at least one of position and shape of the pointing element.

With this configuration, if the pointing element is detected from the picked-up image picked up by the image pickup unit, the display unit displays a display object showing at least one of the position and shape of the pointing element. Therefore, even when the display unit is displaying an image, the user can be allowed to recognize the position or shape of the pointing element while the visibility of this image is maintained.

In the head-mounted display device, the display unit may display the image as superimposed on the external scene visually recognized by the user. The image pickup unit may pick up an image over a range including at least a part of the external scene visually recognized by the user. The control unit may cause the display object to be displayed at a position corresponding to a position where the user visually recognizes the pointing element in the external scene.

With this configuration, the display object can be displayed at the position corresponding to the position where the user visually recognizes the pointing element in the external scene. Therefore, the user can recognize the position of the pointing element, based on the position of displayed display object.

In the head-mounted display device, the display unit may be configured to be able to transmit external light and may have a transmittance adjustment unit which adjusts a transmittance of the external light transmitted through the display unit. The control unit may switch between display and non-display of the display object, based on the transmittance of the external light adjusted by the transmittance adjustment unit.

With this configuration, the display object is switched between display and non-display, based on the transmittance of the external light. Therefore, when the transmittance of the external light is restrained to a low level by the transmittance adjustment unit and the visibility of the external field is thus reduced, the display object is displayed. Thus, the user can be allowed to recognize the state of the pointing element.

In the head-mounted display device, the control unit may switch between display and non-display of the display object, based on a size of the image displayed by the display unit.

With this configuration, the display object can be displayed when it is determined that the visibility of the external field is reduced because the image displayed by the display unit has a large size.

In the head-mounted display device, the operation detection unit may detect an operation with a combination of the pointing element and a sub-pointing element that is different from the pointing element, based on the picked-up image picked up by the image pickup unit.

With this configuration, the image on the display unit can be controlled by the operation with the combination of the pointing element and the sub-pointing element.

In the head-mounted display device, the control unit may cause an image that specifies processing executable by the control unit to be displayed, corresponding to a site on the pointing element or a site on the display object showing the shape of the pointing element. The control unit may determine a selected site based on a pointed position of the sub-pointing element on the pointing element or the display object detected by the operation detection unit. The control unit may execute processing corresponding to the determined site.

With this configuration, by changing the pointed position of the sub-pointing element on the pointing element or the display object, it is possible to select an image that specifies processing corresponding to the site on the pointing element or the display object. Also, processing corresponding to the image that specifies the selected processing can be executed.

In the head-mounted display device, the control unit may cause the image that specifies processing to be displayed as superimposed on the pointing element or the display object showing the shape of the pointing element, or may cause the image that specifies processing to be displayed around the pointing element or the display object.

With this configuration, the image that specifies processing can be displayed as superimposed on the pointing element or the display object, or around the pointing element or the display object. Thus, the image that specifies processing can be easily selected by the operation with the combination of the pointing element and the sub-pointing element.

In the head-mounted display device, the display object may be an image of a hand of the user picked up by the image pickup unit or an image showing a part or an entirety of a contour of the hand.

With this configuration, an image of a hand of the user or an image showing a part or the entirety of the contour of the hand can be displayed as the display object. Therefore, even when the hand of the user is not visible due to the image displayed by the display unit, the user is allowed to recognize the image of the hand or the contour of the hand and can execute an operation using the hand.

In the head-mounted display device, the control unit may switch between and execute an operation mode in which the processing corresponding to the site on the pointing element or the display object selected by the operation detected by the operation detection unit is executed, and a setting mode in which the processing corresponding to the site on the pointing element or the display object is set.

With this configuration, since the setting mode is provided, the processing corresponding to the site on the hand or the image of the hand can be changed. Also, since the operation mode is provided, it is possible to cause the head-mounted display device to execute the processing corresponding to the site on the pointing element or the display object.

Another aspect of the invention is directed to a program executed by a computer installed in a head-mounted display device that includes a display unit which is mounted on a head of a user and displays an image in such a way that the user can visually recognize an external scene, an image pickup unit, and a control unit which controls the image displayed by the display unit. The program causes the computer to execute: a procedure of detecting a pointing element based on a picked-up image picked up by the image pickup unit; and a procedure of causing the display unit to display a display object showing at least one of position and shape of the pointing element if the pointing element is detected from the picked-up image.

With this configuration, if the pointing element is detected from the picked-up image picked up by the image pickup unit, the display unit displays a display object showing at least one of the position and shape of the pointing element. Therefore, even when the display unit is displaying an image, the user can be allowed to recognize the position or shape of the pointing element while the visibility of this image is maintained.

Still another aspect of the invention is directed to a method for controlling a head-mounted display device that includes a display unit which is mounted on a head of a user and displays an image in such a way that the user can visually recognize an external scene, an image pickup unit, and a control unit which controls the image displayed by the display unit. The method includes: causes detecting a pointing element based on a picked-up image picked up by the image pickup unit; and causing the display unit to display a display object showing at least one of position and shape of the pointing element if the pointing element is detected from the picked-up image.

With this configuration, if the pointing element is detected from the picked-up image picked up by the image pickup unit, the display unit displays a display object showing at least one of the position and the shape of the pointing element. Therefore, even when the display unit is displaying an image, the user can be allowed to recognize the position or the shape of the pointing element while the visibility of this image is maintained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
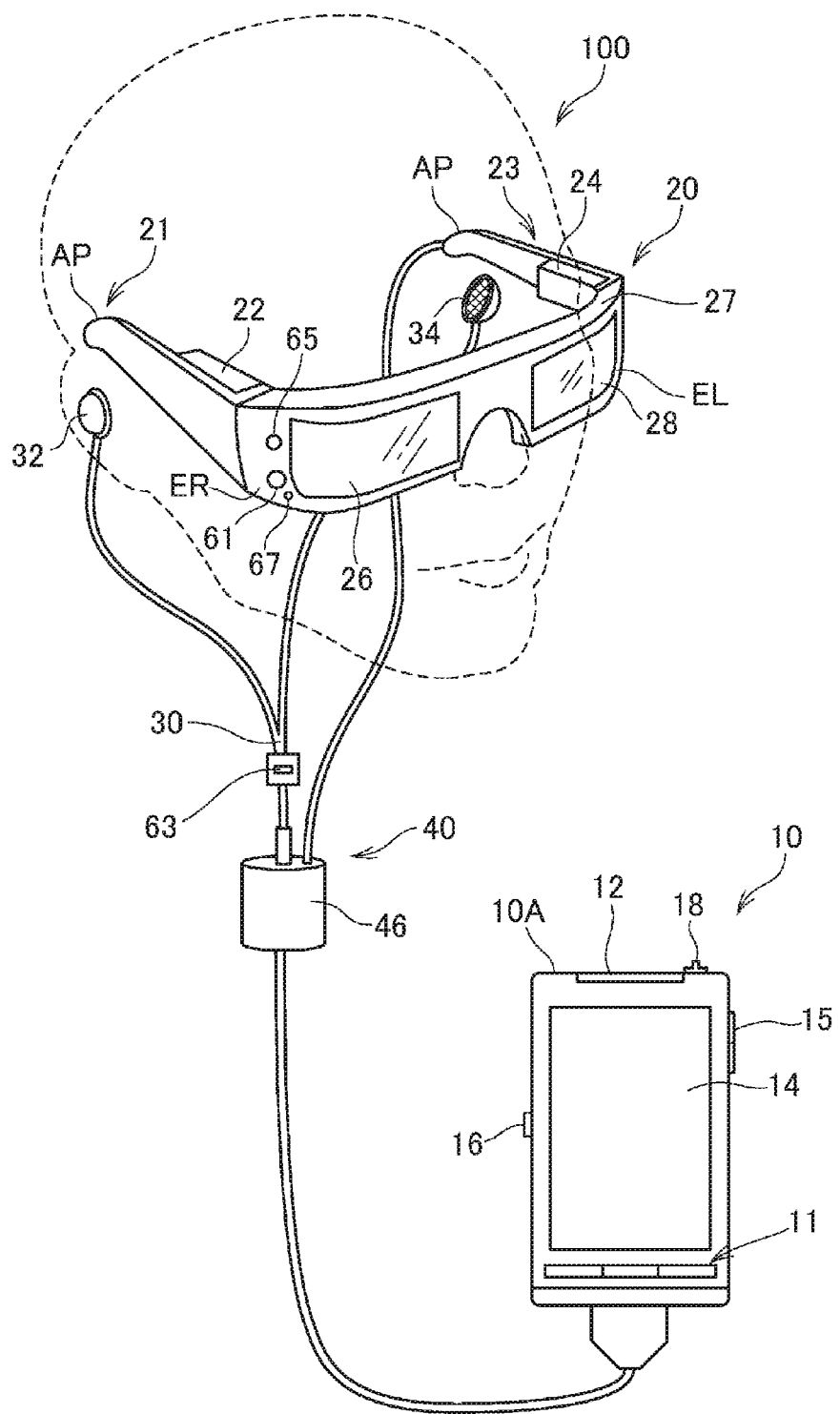
FIG. 1 is an explanatory view showing the outer configuration of an HMD.

FIG. 1 is an explanatory view showing the outer configuration of an HMD (head-mounted display device) 100 according to an embodiment to which the invention is applied.

The HMD 100 is a display device having an image display unit 20 (display unit) which displays an image in such a way that the user can visually recognize the external scene in the state where the HMD 100 is mounted on the head of the user, and a control device 10 which controls the image display unit 20. The control device 10 has a flat box-shaped case 10A (casing or main body), as shown in FIG. 1, and has various parts, described later, in the case 10A. On the face side of the case 10A, various operation buttons 11, a switch, and a track pad 14 and the like for accepting an operation by the user are provided. As the user operates these, the control device 10 functions as the controller of the HMD 100.

The image display unit 20 is a wearable unit in the form of eyeglasses to be mounted on the head of the user and is configured to be able to transmit external light. The image display unit 20 has a right display unit 22, a left display unit 24, a right light guide plate 26, and a left light guide plate 28, in a main body configured of a right holding part 21, a left holding part 23, and a front frame 27.

The right holding part 21 and the left holding part 23 each extend backward from both ends of the front frame 27 and hold the image display unit 20 on the head of the user, like the temples of eyeglasses. Of the two ends of the front frame 27, the end part situated on the right-hand side of the user when the user is wearing the image display unit 20 is referred to as an end part ER, and the end part situated on the left-hand side of the user is referred to as an end part EL. The right holding part 21 is provided, extending from the end part ER of the front frame 27 to a position corresponding to the right temporal region of the user when the user is wearing the image display unit 20. The left holding part 23 is provided, extending from the end part EL of the front frame 27 to the left temporal region of the user when the user is wearing the image display unit 20.

The right light guide plate 26 and the left light guide plate 28 are provided on the front frame 27. The right light guide plate 26 is situated in front of the right eye of the user when the user is wearing the image display unit 20, and allows the right eye to visually recognize an image. The left light guide plate 28 is situated in front of the left eye of the user when the user is wearing the image display unit 20, and allows the left eye to visually recognize an image.

The front frame 27 has a shape such that one end of the right light guide plate 26 and one end of the left light guide plate 28 are connected to each other. The connecting position between the right light guide plate 26 and the left light guide plate 28 is situated at the glabella of the user when the user is wearing the image display unit 20. On the front frame 27, a nose pad part to be butted against the nose of the user when the user is wearing the image display unit 20 may be provided at the connecting position between the right light guide plate 26 and the left light guide plate 28. In this case, the image display unit 20 can be held on the head of the user with the nose pad part, the right holding part 21, and the left holding part 23. Also, a belt (not illustrated) that comes in contact with the back of the user's head when the user is wearing the image display unit 20 may be connected to the right holding part 21 and the left holding part 23. In this case, the image display unit 20 can be firmly held on the head of the user with the belt.

The right display unit 22 is a unit for displaying an image through the right light guide plate 26. The right display unit 22 is provided on the right holding part 21 and is situated near the right temporal region of the user when the user is wearing the image display unit. The left display unit 24 is a unit for displaying an image through the left light guide plate 28. The left display unit 24 is provided on the left holding part 23 and is situated near the left temporal region of the user when the user is wearing the image display unit. The right display unit 22 and the left display unit 24 are also collectively referred to as a "display drive unit".

The right light guide plate 26 and the left light guide plate 28 in this embodiment are optical units formed of a light-transmitting resin or the like, and are configured of, for example, prisms. The right light guide plate 26 and the left light guide plate 28 guide image light outputted from the right display unit 22 and the left display unit 24 to the eyes of the user.

The image display unit 20 guides the image light generated by each of the right display unit 22 and the left display unit 24 to the right light guide plate 26 and the left light guide plate 28 and allows the user to visually recognize a virtual image based on this image light, thus displaying an image. When external light becomes incident on the eyes of the user from in front of the user through the right light guide plate 26 and the left light guide plate 28, image light forming a virtual image and the external light become incident on the eyes of the user and therefore the visibility of the virtual image is influenced by the intensity of the external light. Therefore, for example, a right electronic shade 227 and a left electronic shade 247 (FIG. 4) are provided on the front frame 27, and the visibility of the virtual image can thus be adjusted. The right electronic shade 227 and the left electronic shade 247 are equivalent to the "transmittance adjustment unit" according to the invention.

A camera 61 is arranged on the front frame 27 of the image display unit 20. It is preferable that the camera 61 picks up an image in the direction of the external scene which the user visually recognizes when wearing the image display unit 20. The camera 61 is provided at a position that does not block the external light transmitted through the right light guide plate 26 and the left light guide plate 28, on the front surface of the front frame 27. In the example of FIG. 1, the camera 61 is arranged on the side of the end part ER of the front frame 27. The camera 61 may be arranged on the side of the end part EL of the front frame 27, or may be arranged at the connecting part between the right light guide plate 26 and the left light guide plate 28. The camera 61 is equivalent to the "image pickup unit" according to the invention.

The camera 61 is a digital camera having an image pickup element such as CCD or CMOS, and an image pickup lens or the like. While the camera 61 in this embodiment is a monocular camera, a stereo camera may be employed. The camera 61 picks up an image of at least a part of the external scene (real space) in the direction of the front of the HMD 100, that is, in the field of vision of the user when the user is wearing the HMD 100. In other words, it can be said that the camera 61 picks up an image in a range or direction overlapping with the field of vision of the user and picks up an image in the direction in which the user gazes. The width of the angle of view of the camera 61 can be suitably set. In this embodiment, the width of the angle of view of the camera 61 includes the external field visually recognized by the user through the right light guide plate 26 and the left light guide plate 28, as described later. More preferably, the width of the angle of view of the camera 61 is set in such a way as to be able to pick up an image of the entirety of the field of vision of the user that the user can visually recognize through the right light guide plate 26 and the left light guide plate 28.

The camera 61 executes image pickup under the control of a detection control unit 149 provided in a control unit 150 (FIG. 5) and outputs picked-up image data to the detection control unit 149.

Figure 2:
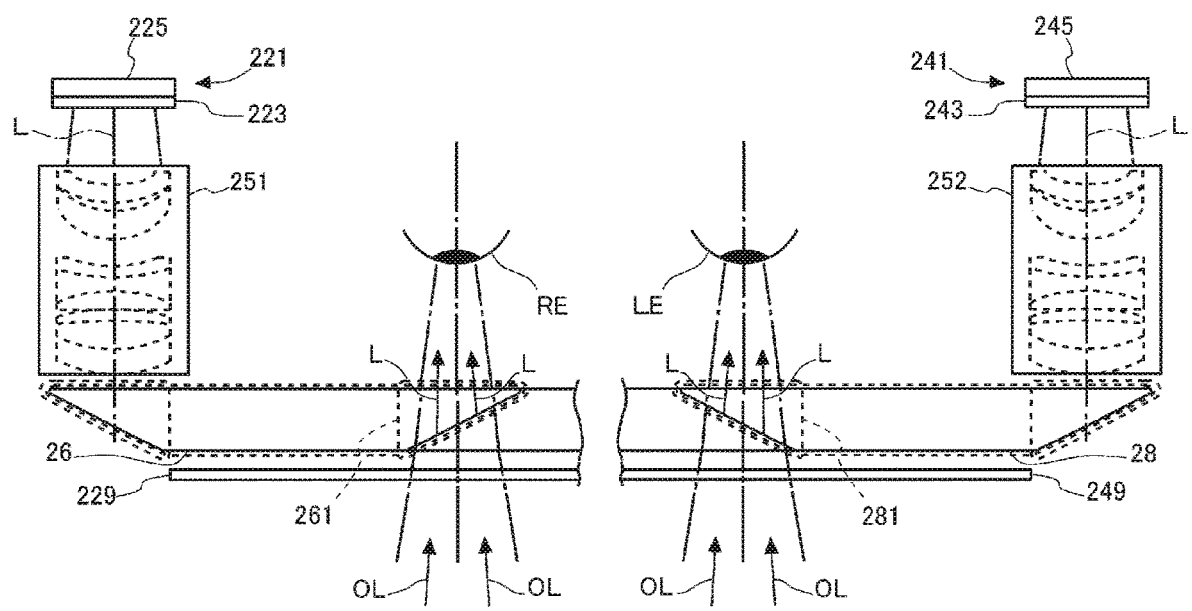
FIG. 2 shows the configuration of an optical system of an image display unit.

FIG. 2 is a plan view of essential parts showing the configuration of the optical system provided in the image display unit 20. For the sake of convenience of the description, FIG. 2 illustrates the right eye RE and the left eye LE of the user.

As shown in FIG. 2, the right display unit 22 and the left display unit 24 are configured to be bilaterally symmetrical to each other. As a configuration to allow the right eye RE of the user to visually recognize an image, the right display unit 22 has an OLED (organic light emitting diode) unit 221 which emits image light, and a right optical system 251 which has a lens group or the like to guide image light L emitted from the OLED unit 221. The image light L is guided to the right light guide plate 26 by the right optical system 251.

Figure 5:
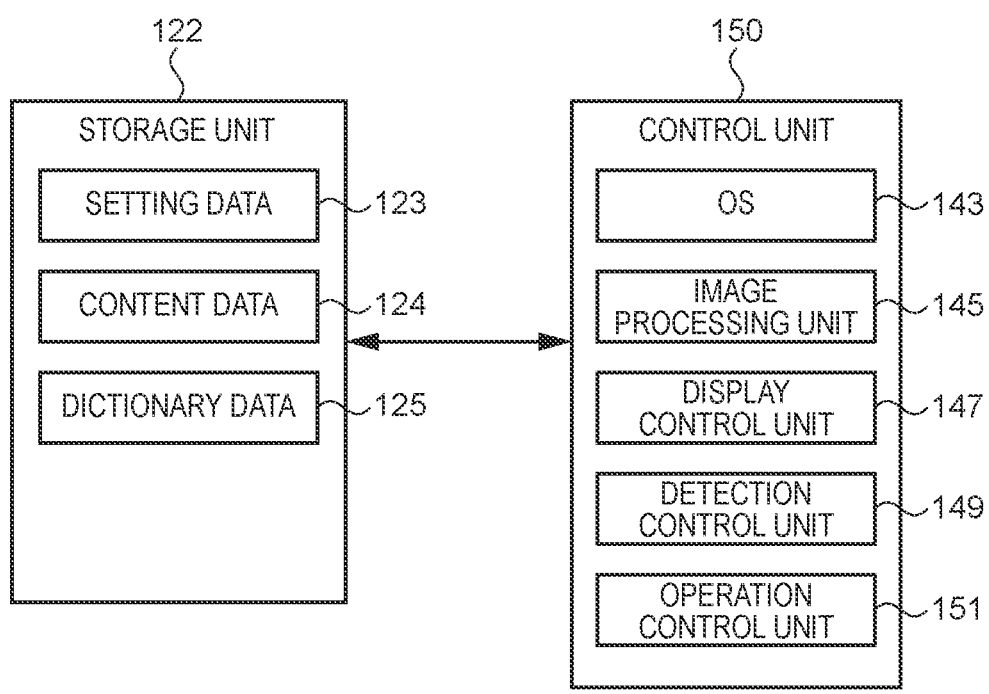
FIG. 5 is a block diagram of a control unit and a storage unit.

The OLED unit 221 has an OLED panel 223 and an OLED drive circuit 225 which drives the OLED panel 223. The OLED panel 223 is a self-emitting display panel configured of light emitting elements arranged in the form of a matrix which emit light by organic electroluminescence and emit color light of R (red), G (green), and B (blue), respectively. The OLED panel 223 has a plurality of pixels, each pixel including one R, G and B element each, and an image is formed by the pixels arranged in the form of a matrix. The OLED drive circuit 225 executes selection from and energization of the light emitting elements provided in the OLED panel 223 and causes the light emitting elements of the OLED panel 223 to emit light, under the control of the control unit 150 (FIG. 5). The OLED drive circuit 225 is fixed to the back side of the OLED panel 223, that is, the back side of the light emitting surface, by bonding or the like. The OLED drive circuit 225 may be configured of, for example, a semiconductor device which drives the OLED panel 223, and may be mounted on a substrate (not illustrated) fixed to the back side of the OLED panel 223.

The OLED panel 223 may employ a configuration in which light emitting elements that emit white light are arranged in the form of a matrix, with color filters corresponding to the color light of R, G and B superimposed thereon. Moreover, the OLED panel 223 with a WRGB configuration having a light emitting element which radiates W (white) light in addition to light emitting elements which radiate the color light of R, G and B may be employed.

The right optical system 251 has a collimating lens which turns the image light L emitted from the OLED panel 223 into a parallel luminous flux. The image light L, turned into the parallel luminous flux by the collimating lens, becomes incident on the right light guide plate 26. In the optical path through which the light is guided inside the right light guide plate 26, a plurality of reflection surfaces that reflects the image light L is formed. The image light L is reflected a plurality of times inside the right light guide plate 26 and is thus guided toward the right eye RE. On the right light guide plate 26, a half mirror 261 (reflection surface) situated in front of the right eye RE is formed. The image light L is reflected by the half mirror 261 and subsequently emitted from the right light guide plate 26 toward the right eye RE. This image light L forms an image on the retina of the right eye RE, thus allowing the user to visually recognize the image.

As a configuration to allow the left eye LE of the user to visually recognize an image, the left display unit 24 has an OLED unit 241 which emits image light, and a left optical system 252 having a lens group or the like to guide image light L emitted from the OLED unit 241. The image light L is guided to the left light guide plate 28 by the left optical system 252.

The OLED unit 241 has an OLED panel 243 and an OLED drive circuit 245 which drives the OLED panel 243. The OLED panel 243 is a self-emitting display panel configured similarly to the OLED panel 223. The OLED drive circuit 245 executes selection from and energization of the light emitting elements provided in the OLED panel 243 and causes the light emitting elements of the OLED panel 243 to emit light, under the control of the control unit 150 (FIG. 5). The OLED drive circuit 245 is fixed to the back side of the OLED panel 243, that is, the back side of the light emitting surface, by bonding or the like. The OLED drive circuit 245 may be configured of, for example, a semiconductor device which drives the OLED panel 243, and may be mounted on a substrate (not illustrated) fixed to the back side of the OLED panel 243.

The left optical system 252 has a collimating lens which turns the image light L emitted from the OLED panel 243 into a parallel luminous flux. The image light L, turned into the parallel luminous flux by the collimating lens, becomes incident on the left light guide plate 28. The left light guide plate 28 is an optical element in which a plurality of reflection surfaces that reflects the image light L is formed. The left light guide plate 28 is, for example, a prism. The image light L is reflected a plurality of times inside the left light guide plate 28 and is thus guided toward the left eye LE. On the left light guide plate 28, a half mirror 281 (reflection surface) situated in front of the left eye LE is formed. The image light L is reflected by the half mirror 281 and subsequently emitted from the left light guide plate 28 toward the left eye LE. This image light L forms an image on the retina of the left eye LE, thus allowing the user to visually recognize the image.

With the configuration described above, the HMD 100 functions as a see-through display device. That is, the image light L reflected by the half mirror 261 and external light OL transmitted through the right light guide plate 26 become incident on the right eye RE of the user. The image light L reflected by a half mirror 281 and external light OL transmitted through the left light guide plate 28 become incident on the left eye LE of the user. In this way, the HMD 100 causes the image light L of the image processed inside and the external light OL to become incident, as superimposed on each other, on the eyes of the user. The user sees the external scene through the right light guide plate 26 and the left light guide plate 28 and visually recognizes the image based on the image light L as superimposed on the external scene.

The half mirrors 261, 281 are image extraction units which reflect the image light outputted from the right display unit 22 and the left display unit 24, respectively, and thus take out an image. That is, it can be said that the half mirrors 261, 281 are a display unit.

The left optical system 252 and the left light guide plate 28 are collectively referred to as a "left light guide unit". The right optical system 251 and the right light guide plate 26 are collectively referred to as a "right light guide unit". The configurations of the right light guide unit and the left light guide unit are not limited to the foregoing example. An arbitrary form can be used, provided that a virtual image is formed in front of the eyes of the user, using image light. For example, a diffraction grating may be used, or a semitransmissive reflection film may be used.

The image display unit 20 also has a right electronic shade 227 and a left electronic shade 247. The right electronic shade 227 has a shade drive unit 228 (FIG. 4) and a liquid crystal panel 229. The left electronic shade 247 has a shade drive unit 248 (FIG. 4) and a liquid crystal panel 249.

The liquid crystal panel 229 of the right electronic shade 227 is provided on the front side of the right light guide plate 26, that is, on the side opposite to the head of the user. The liquid crystal panel 229 is arranged spaced apart from the right light guide plate 26, as shown in FIG. 2. This is because if the liquid crystal panel 229 is bonded to the right light guide plate 26, total reflection of the image light L on the right light guide plate 26 may be obstructed.

The liquid crystal panel 249 of the left electronic shade 247 is provided on the front side of the left light guide plate 28, that is, on the side opposite to the head of the user. The liquid crystal panel 249, too, is arranged spaced apart from the left light guide plate 28, as shown in FIG. 2.

The liquid crystal panels 229, 249 can be arranged superimposed on the right light guide plate 26 and the left light guide plate 28. In this case, a material having a lower refractive index than the refractive index of the right light guide plate 26 and the left light guide plate 28 needs to be bonded to the entire reflection surfaces of the right light guide plate 26 and the left light guide plate 28.

Each of the liquid crystal panels 229, 249 is a transmission-type liquid crystal panel in which a plurality of pixels is arranged in the form of a matrix. The liquid crystal panels 229, 249 are configured of TN (twisted nematic) liquid crystal, guest-host liquid crystal, PDLC (polymer dispersed liquid crystal) or the like. Also, an electrochromic or gas-chromic material may be provided instead of the liquid crystal panels 229, 249.

The liquid crystal panels 229, 249 increase and decrease, on a pixel basis, the transmittance of external light guided to the eye RE of the user from outside according to the increase and decrease in the voltage supplied. The right electronic shade 227 and the left electronic shade 247 in this embodiment have a transmittance of external light of 100% in the state where no voltage is supplied, and a transmittance of external light of 0% (blocked) in the state where the voltage supplied is at its maximum.

Back to FIG. 1, the control device 10 and the image display unit 20 are connected together via a connection cable 40. The connection cable 40 is removably connected to a connector (not illustrated) provided in a bottom part of the case 10A and connects to various circuits inside the image display unit 20 from the distal end of the left holding part 23. The connection cable 40 has a metal cable or optical fiber cable which transmits digital data. The connection cable 40 may also have a metal cable which transmits analog data. A connector 46 is provided at a halfway point along the connection cable 40. The connector 46 is a socket to connect a stereo mini plug. The connector 46 and the control device 10 are connected together, for example, via a line which transmits analog audio signals. In the example of the configuration shown in FIG. 1, a headset 30, including a right earphone 32 and a left earphone 34 forming a stereo headphone and a microphone 63, is connected to the connector 46.

Figure 4:
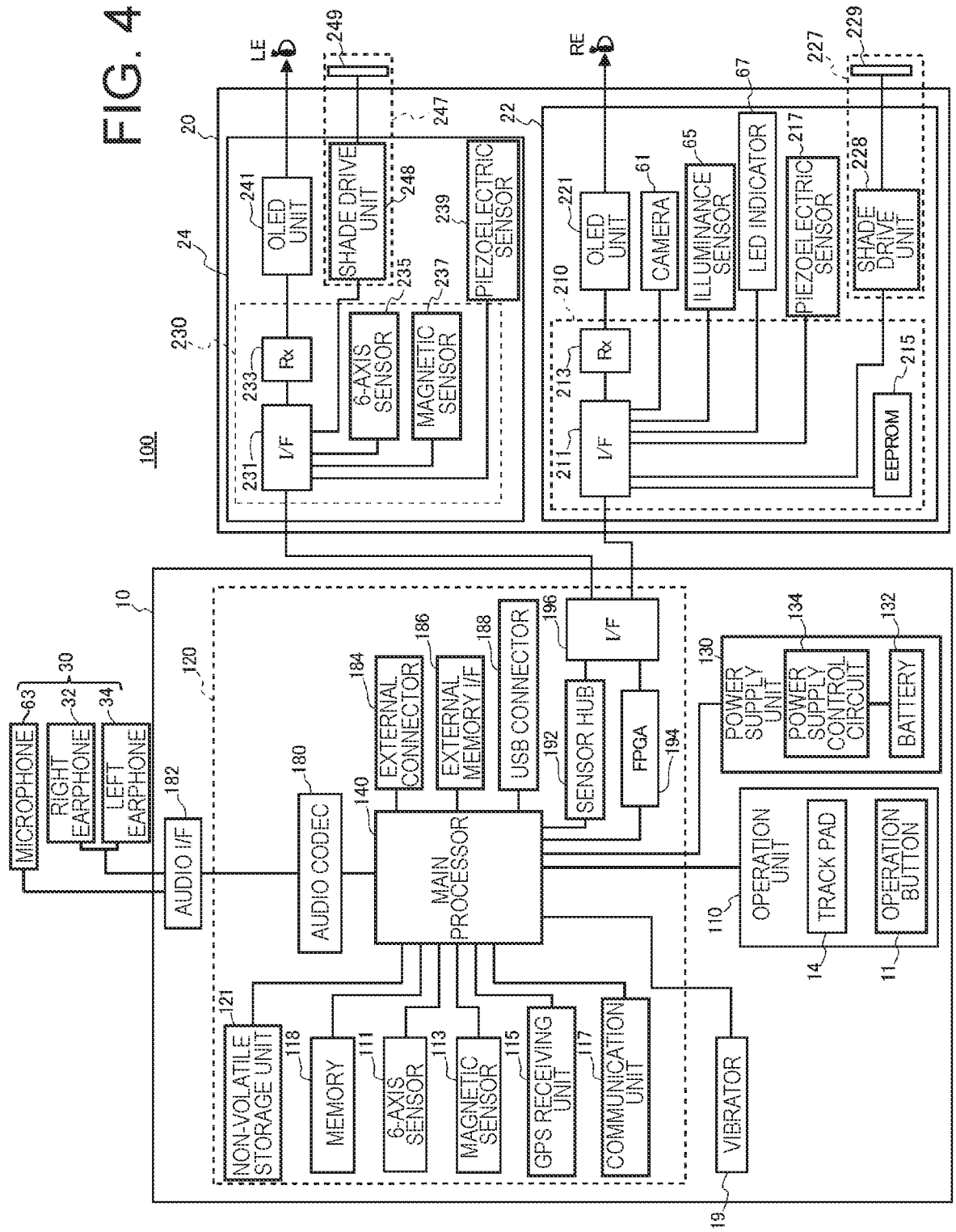
FIG. 4 is a block diagram showing each part forming the HMD.

The microphone 63 is arranged in such a way that the sound collecting part of the microphone 63 faces the direction of the line of sight of the user, for example, as shown in FIG. 1. The microphone 63 collects sounds and outputs an audio signal to an audio interface 182 (FIG. 4). The microphone 63 may be a monaural microphone or stereo microphone, and may be a directional microphone or non-directional microphone.

The control device 10 has the operation buttons 11, an LED indicator 12, a track pad 14, an up-down key 15, a changeover switch 16, and power switch 18, as operation target parts to be operated by the user. These operation target parts are arranged on the surface of the case 10A.

The operation buttons 11 include a menu key, a home key, a back key and the like for carrying out the operation of an operating system (hereinafter simply referred to as OS) 143 (FIG. 5) or the like executed by the control device 10, and particularly include those displaced by a pressing operation, of these keys and switches. The LED indicator 12 turns on or flashes according to the operating state of the HMD 100. The up-down key 15 is used to input an instruction to increase or decrease the sound volume outputted from the right earphone 32 and the left earphone 34 or to input an instruction to increase or decrease the brightness of the display on the image display unit 20. The changeover switch 16 is a switch to change the input corresponding to the operation of the up-down key 15. The power switch 18 is a switch to turn on/off the power of the HMD 100 and is configured of, for example, a slide switch.

The track pad 14 has an operation surface where a touch operation is detected, and outputs an operation signal corresponding to the operation on the operation surface. The detection method on the operation surface is not particularly limited. An electrostatic type, a pressure detection-type, and an optical type or the like can be employed. A touch (touch operation) on the track pad 14 is detected, for example, by a touch sensor (not illustrated) embedded along the operation surface.

Figure 3:
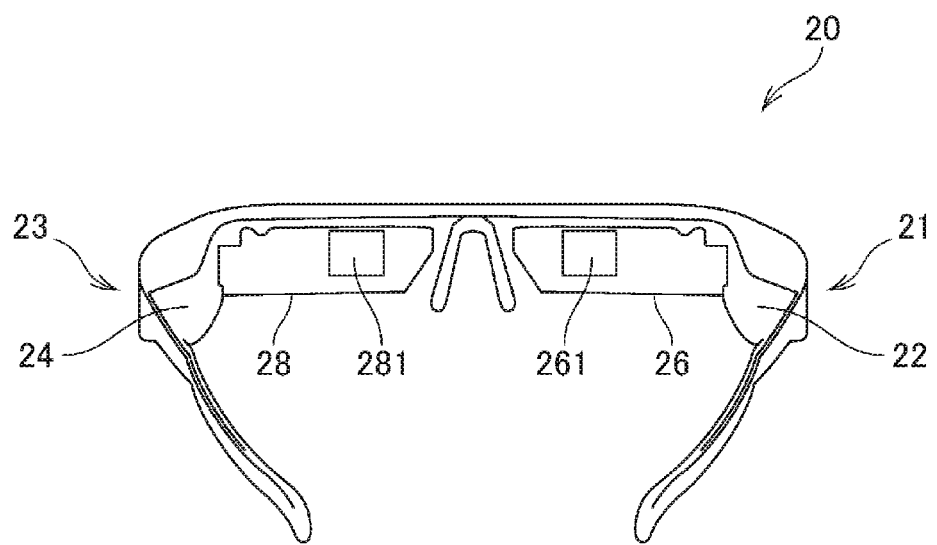
FIG. 3 is a perspective view of essential parts of the image display unit, as viewed from the side of the user's head.

FIG. 3 is a perspective view of essential parts of the image display unit 20, as viewed from the side of the user's head. That is, FIG. 3 shows the side that comes in contact with the user's head of the image display unit 20, in other words, the side visible to the right eye RE and the left eye LE of the user see. To put is differently, the back sides of the right light guide plate 26 and the left light guide plate 28 are visible to the user. In FIG. 3, the illustration of the connection cable 40 is omitted.

In FIG. 3, the half mirror 261 for casting image light to the right eye RE and the half mirror 281 for casting image light to the left eye LE are seen as substantially quadrilateral areas. Also, the entirety of the right light guide plate 26 and the left light guide plate 28 including the half mirrors 261, 281 transmits external light, as described above. Therefore, the user visually recognizes the external scene transmitted through the entirety of the right light guide plate 26 and the left light guide plate 28 and visually recognizes a rectangular display image at the positions of the half mirrors 261, 281.

The camera 61 is arranged at the end part on the right-hand side of the image display unit 20, and picks up an image in the direction in which both eyes of the user are directed, that is, in front of the user. The optical axis of the camera 61 is in a direction including the directions of the lines of sight of the right eye RE and the left eye LE. The external scene which the user can visually recognize when wearing the HMD 100 is not necessarily at infinity. For example, when the user gazes with both eyes at an object situated in front of the user, the distance from the user to the object tends to be approximately 30 cm to 10 m, and more frequently, 1 to 4 m. Thus, upper and lower limit benchmarks of the distance from the user to the object at the time of normal use may be defined for the HMD 100. The benchmarks may be found based on examinations and experiments or may be set by the user. It is preferable that the optical axis and the angle of view of the camera 61 are set in such a way that the object is included in the angle of view when the distance to the object at the time of normal use corresponds to the set upper benchmark or when the distance corresponds to the lower limit benchmark.

Generally, the human viewing angle is approximately 200 degrees horizontally and approximately 125 degrees vertically. Of this, the useful field of view, where an excellent information extraction ability can be exerted, is approximately 30 degrees horizontally and approximately 20 degrees vertically. The stable fixation field, where a gazing point at which a human gazes can be viewed quickly and stably, is approximately 60 to 90 degrees horizontally and approximately 45 to 70 degrees vertically. When the gazing point is the object situated in front of the user, the useful field of view is approximately 30 degrees horizontally and approximately 20 degrees vertically, with the lines of sight of the right eye RE and the left eye LE at its center, in the field of view of the user. The stable fixation field is approximately 60 to 90 degrees horizontally and approximately to 70 degrees vertically. The viewing angle is approximately 200 degrees horizontally and approximately 125 degrees vertically. The actual field of view which the user visually recognizes through the right light guide plate 26 and the left light guide plate 28 can be referred to as FOV (field of view). In the configuration of this embodiment shown in FIGS. 1 and 2, the field of view is equivalent to the actual field of view which the user visually recognizes through the right light guide plate 26 and the left light guide plate 28. The field of view is narrower than the viewing angle and the stable fixation field but broader than the useful field of view.

It is preferable that the angle of view of the camera 61 enables image pickup over a broader range than the field of view of the user. Specifically, it is preferable that the angle of view is at least broader than the useful field of view of the user. More preferably, the angle of view may be broader than the field of view of the user. More preferably, the angle of view may be broader than the stable fixation field of the user. Most preferably, the angle of view may be broader than the viewing angles of both eyes of the user.

The camera 61 may have a so-called wide-angle lens as an image pickup lens and thus may be configured to be able to pick up an image over a broad angle of view. The wide-angle lens may include a lens called an ultra-wide-angle lens or quasi-wide-angle lens. The camera 61 may also include a monofocal lens or a zoom lens, and may include a lens group made up of a plurality of lenses.

FIG. 4 is a block diagram functionally showing the configuration of each part of the HMD 100.

The control device 10 has a main processor 140 which executes a program and controls the HMD 100. A memory 118 and a non-volatile storage unit 121 are connected to the main processor 140. Also, the track pad 14 and an operation unit 110 are connected, as an input device, to the main processor 140. Also, a 6-axis sensor 111, a magnetic sensor 113, and a GPS receiving unit 115 are connected, as sensors, to the main processor 140. Moreover, a communication unit 117, an audio codec 180, an external connector 184, an external memory interface 186, a USB connector 188, a sensor hub 192, and an FPGA 194 are connected to the main processor 140. These components function as interfaces to the outside.

The main processor 140 is mounted on a controller board 120 built in the control device 10. On the controller board 120, the memory 118, the non-volatile storage unit 121 and the like may be mounted in addition to the main processor 140. In this embodiment, the 6-axis sensor 111, the magnetic sensor 113, the GPS receiving unit 115, the communication unit 117, the memory 118, the non-volatile storage unit 121, the audio codec 180 and the like are mounted on the controller board 120. Also, the external connector 184, the external memory interface 186, the USB connector 188, the sensor hub 192, the FPGA 194, and an interface 196 may be mounted on the controller board 120.

The memory 118 forms a work area for temporarily storing a program that is executed and data that is processed, when the main processor 140 executes the program. The non-volatile storage unit 121 is configured of a flash memory or eMMC (embedded multimedia card). The non-volatile storage unit 121 stores a program executed by the main processor 140 and various data processed by the main processor 140 when executing the program.

The operation unit 110 includes the operation buttons 11 and the track pad 14. The track pad 14 has an operation surface (not illustrated). The track pad 14 detects a touch operation on the operation surface and specifies the operation position on the operation surface of the detected touch operation. The track pad 14 outputs an operation signal indicating the specified operation position of the touch operation to the main processor 140.

The 6-axis sensor 111 is a motion sensor (inertial sensor) having a 3-axis acceleration sensor and a 3-axis gyro (angular velocity) sensor. As the 6-axis sensor 111, an IMU (inertial measurement unit) in which these sensors are formed as modules may be employed.

The magnetic sensor 113 is, for example, a 3-axis geomagnetic sensor.

The GPS (global positioning system) receiving unit 115 has a GPS antenna, not illustrated, and thus receives radio signals transmitted from GPS satellites and detects the coordinates of the current location of the control device 10.

The 6-axis sensor 111, the magnetic sensor 113, and the GPS receiving unit 115 output detected values to the main processor 140 according to a sampling frequency designated in advance. Alternatively, the 6-axis sensor 111, the magnetic sensor 113, and the GPS receiving unit 115 output detected values to the main processor 140 in response to a request by the main processor 140 and at a timing designated by the main processor 140.

The communication unit 117 executes wireless communication with an external device. The communication unit 117 includes an antenna, an RF circuit, a baseband circuit, a communication control circuit and the like. Alternatively, the communication unit 117 is configured as a device in which these components are integrated. The communication unit 117 carries out wireless communication conforming to a standard such as Bluetooth (trademark registered) or wireless LAN (including Wi-Fi (trademark registered)).

The audio interface 182 is an interface for inputting and outputting an audio signal. In this embodiment, the audio interface 182 includes the connector 46 (FIG. 1) provided in the connection cable 40. The audio codec 180 is connected to the audio interface 182 and encodes or decodes an audio signal inputted or outputted via the audio interface 182. The audio codec 180 may have an A/D converter which converts an analog audio signal into digital audio data, or a D/A converter which carries out reverse conversion. The HMD 100 in this embodiment, for example, outputs a sound via the right earphone 32 and the left earphone 34 and collects a sound with the microphone 63. The audio codec 180 converts digital audio data outputted from the main processor 140 into an analog audio signal and outputs the analog audio signal via the audio interface 182. Also, the audio codec 180 converts an analog audio signal inputted to the audio interface 182 into digital audio data and outputs the digital audio data to the main processor 140.

The external connector 184 is a connector for connecting an external device which communicates with the main processor 140. The external connector 184 is an interface for connecting an external device, for example, in the case of connecting the external device to the main processor 140 and debugging a program executed by the main processor 140 or collecting operation logs of the HMD 100.

The external memory interface 186 is an interface to which a portable memory device can be connected. The external memory interface 186 includes, for example, a memory card slot in which a card-type recording medium is loaded to read data, and an interface circuit. The size, shape, standard and the like of the card-type recording medium in this case are not particularly limited and can be changed where appropriate.

The USB (universal serial bus) connector 188 includes a connector conforming to the USB standard, and an interface circuit, and can connect a USB memory device, smartphone, computer or the like. The size, shape, and version of the USB standard to conform to of the USB connector 188 can be suitably selected and changed.

The HMD 100 also has a vibrator 19. The vibrator 19 has a motor (not illustrated) and an eccentric rotor (not illustrated) or the like, and generates vibration under the control of the main processor 140. For example, when an operation on the operation unit 110 is detected or when the power of the HMD 100 is switched on/off, or the like, the HMD 100 causes the vibrator 19 to generate vibration in a predetermined vibration pattern.

The sensor hub 192 and the FPGA 194 are connected to the image display unit 20 via the interface (I/F) 196. The sensor hub 192 acquires detected values from various sensors provided in the image display unit 20 and outputs the detected values to the main processor 140. The FPGA 194 executes processing of data sent and received between the main processor 140 and each part of the image display unit 20 and transmission of the data via the interface 196.

Each of the right display unit 22 and the left display unit 24 of the image display unit 20 is connected to the control device 10. As shown in FIG. 1, in the HMD 100, the connection cable 40 is connected to the left holding part 23, and a wire leading to this connection cable 40 is laid inside the image display unit 20. Each of the right display unit 22 and the left display unit 24 is thus connected to the control device 10.

The right display unit 22 has a display unit board 210. An interface (I/F) 211 connected to the interface 196, a receiving unit (Rx) 213 which receives data inputted from the control device 10 via the interface 211, and an EEPROM 215 (storage unit) are mounted on the display unit board 210.

The interface 211 connects the receiving unit 213, the EEPROM 215, the OLED unit 221, the camera 61, an illuminance sensor 65, an LED indicator 67, a piezoelectric sensor 217, and the shade drive unit 228 to the control device 10.

The EEPROM (electrically erasable programmable read-only memory) 215 stores various data in a form readable by the main processor 140. The EEPROM 215 stores, for example, data about light emission characteristics and display characteristics of the OLED units 221, 241 of the image display unit 20, and data about characteristics of sensors provided in the right display unit 22 or the left display unit 24, or the like. These data are generated by an inspection and written in the EEPROM 215 at the time of shipping the HMD 100 from the plant. After the shipping, the main processor 140 can carry out processing using the data in the EEPROM 215.

The camera 61 executes image pickup according to a signal inputted via the interface 211 and outputs picked-up image data or a signal indicating the result of the image pickup to the control device 10.

The illuminance sensor 65 is provided at the end part ER of the front frame 27 and arranged in such a way as to receive external light from in front of the user wearing the image display unit 20, as shown in FIG. 1. The illuminance sensor 65 outputs a detected value corresponding to the amount of light received (intensity of received light).

The LED indicator 67 is arranged near the camera 61 at the end part ER of the front frame 27, as shown in FIG. 1. The LED indicator 67 turns on during the execution of image pickup by the camera 61 and thus reports that image pickup is underway.

The piezoelectric sensor 217 is provided, for example, at a position that is on the right holding part 21 and that comes in contact with the ear of the user when the image display unit 20 is mounted on the head of the user. When the image display unit 20 is mounted on the head of the user and the ear of the user comes in contact with the piezoelectric sensor 217, the piezoelectric sensor 217 outputs a signal indicating that the contact is detected, to the control device 10.

The shade drive unit 228, under the control of the main processor 140, controls the voltage supplied to the right electronic shade 227 and increases or decreases the transmittance of external light of the right electronic shade 227 on a pixel basis.

The receiving unit 213 receives data transmitted from the main processor 140 via the interface 211. When image data of an image to be displayed by the OLED unit 221 is received, the receiving unit 213 outputs the received image data to the OLED drive circuit 225 (FIG. 2).

The left display unit 24 has a display unit board 230. On the display unit board 230, an interface (I/F) 231 connected to the interface 196 and a receiving unit (Rx) 233 which receives data inputted from the control device 10 via the interface 231 are mounted. Also, a 6-axis sensor 235 and a magnetic sensor 237 are mounted on the display unit board 230.

The interface 231 connects the receiving unit 233, the 6-axis sensor 235, the magnetic sensor 237, a piezoelectric sensor 239, and the shade drive unit 248 to the control device 10.

The 6-axis sensor 235 is a motion sensor (inertial sensor) having a 3-axis acceleration sensor and a 3-axis gyro (angular velocity) sensor. As the 6-axis sensor 235, an IMU (inertial measurement unit) in which the above sensors are formed as modules may be employed.

The magnetic sensor 237 is, for example, a 3-axis geomagnetic sensor.

The piezoelectric sensor 239 is provided, for example, at a position that is on the left holding part 23 and that comes in contact with the ear of the user when the image display unit 20 is mounted on the head of the user. When the image display unit 20 is mounted on the head of the user and the ear of the user comes in contact with the piezoelectric sensor 239, the piezoelectric sensor 239 outputs a signal indicating that the contact is detected, to the control device 10.

The shade drive unit 248, under the control of the main processor 140, controls the voltage supplied to the left electronic shade 247 and increases or decreases the transmittance of external light of the left electronic shade 247 on a pixel basis.

The interfaces 211 and 231 are connected to the sensor hub 192. The sensor hub 192 carries out setting of a sampling frequency and initialization of each sensor under the control of the main processor 140. The sensor hub 192 executes energization of each sensor, transmission of control data, acquisition of a detected value or the like, according to the sampling period of each sensor. The sensor hub 192 outputs the detected value from each sensor provided in the right display unit 22 and the left display unit 24 to the main processor 140 at a preset timing. The sensor hub 192 may have the function of temporarily holding the detected value from each sensor at the timing of an output to the main processor 140. The sensor hub 192 may also have the function of converting the output value from each sensor into data in a unified format in order cope with the difference in the signal format or data format of the output value from each sensor, and thus outputting the converted data to the main processor 140.

The FPGA 194 starts and stops the energization of the LED indicator 67 under the control of the main processor 140 and thus causes the LED indicator 67 to light up or flash on and off at the timing when the camera 61 starts and ends image pickup.

The control device 10 has a power supply unit 130 and operates with the power supplied from the power supply unit 130. The power supply unit 130 includes a rechargeable battery 132 and a power supply control circuit 134 which detects the remaining capacity of the battery 132 and controls the recharging of the battery 132. The power supply control circuit 134 is connected to the main processor 140 and outputs the detected value of the remaining capacity of the battery 132 or the detected value of the voltage of the battery 132 to the main processor 140. Based on the electric power supplied from the power supply unit 130, electric power may be supplied from the control device 10 to the image display unit 20. The main processor 140 may be configured to be able to control the state of supply of electric power from the power supply unit 130 to each part of the control device 10 and the image display unit 20.

The HMD 100 may have an interface (not illustrated) for connecting various external devices that serve as content sources. For example, an interface which supports wired connection such as USB interface, micro-USB interface or memory card interface may be employed, or a wireless communication interface may be employed. The external device in this case is an image supply device which supplies an image to the HMD 100. A personal computer (PC), mobile phone terminal, portable game machine or the like may be employed. In this case, the HMD 100 can output an image or sound based on content data inputted from the external device.

FIG. 5 is a functional block diagram of a storage unit 122 and a control unit 150 which form the control system of the control device 10. The storage unit 122 shown in FIG. 5 is a logical storage unit configured of the non-volatile storage unit 121 (FIG. 4) and may include the EEPROM 215. The control unit 150 and various functional units provided in the control unit 150 are formed by the main processor 140 executing a program and thus by hardware and software collaborating with each other. The control unit 150 and the various functional units forming the control unit 150 are configured, for example, by the main processor 140, the memory 118, and the non-volatile storage unit 121.

The control unit 150 executes various kinds of processing using data stored in the storage unit 122 and controls the HMD 100. The storage unit 122 stores various data processed by the control unit 150. The storage unit 122 stores setting data 123, content data 124, and dictionary data 125.

The setting data 123 includes various setting values related to the operation of the HMD 100. For example, the setting data 123 includes setting data of a function displayed as a function display image 310, described later, and setting data of a finger to display the function display image 310, or the like. Also, if a parameter, determinant, arithmetic expression, LUT (lookup table) or the like is used when the control unit 150 controls the HMD 100, these may be included in the setting data 123.

The content data 124 is data of a content including an image or video to be displayed by the image display unit 20 under the control of the control unit 150, and includes image data or video data. The content data 124 may include audio data. The content data 124 may also include image data of a plurality of images. In this case, the plurality of images is not limited to images displayed simultaneously on the image display unit 20.

Also, the content data 124 may be a bidirectional content such that, when the image display unit 20 displays a content, the control device 10 accepts an operation by the user and the control unit 150 executes processing corresponding to the accepted operation. In this case, the content data 124 may include image data of a menu screen displayed when accepting an operation, and data for deciding processing corresponding to an item included in the menu screen, and the like.

The dictionary data 125 stores information for specifying the shape or position of a preset hand or finger (hereinafter referred to as a hand sign). The dictionary data 125 includes data showing the position or shape of a finger in each shape of hand sign, as the information for specifying the hand sign.

The control unit 150 has the functions of an OS 143, an image processing unit 145, a display control unit 147, a detection control unit 149, and an operation control unit 151. The detection control unit 149 is equivalent to the "operation detection unit" according to the invention. The operation control unit 151 is equivalent to the "control unit" according to the invention.

The function of the OS 143 is the function of a control program stored in the storage unit 122. The other units in the control unit 150 are the functions of application programs executed on the OS 143.

The image processing unit 145 generates a signal to be transmitted to the right display unit 22 and the left display unit 24, based on image data of an image or video to be displayed by the image display unit 20. The signal generated by the image processing unit 145 may include a vertical synchronization signal, horizontal synchronization signal, clock signal, analog image signal or the like.

The image processing unit 145 may carry out, when appropriate, resolution conversion processing in which the resolution of image data is converted to a resolution suitable for the right display unit 22 and the left display unit 24. The image processing unit 145 may also execute image adjustment processing in which the luminance and saturation of image data are adjusted, and 2D/3D conversion processing in which 2D image data is generated from 3D image data or in which 3D image data from 2D image data, or the like. In the case where such image processing is executed, the image processing unit 145 generates a signal for displaying an image based on the image data resulting from the processing, and transmits the signal to the image display unit 20 via the connection cable 40.

The image processing unit 145 may be realized by the main processor 140 executing a program, or may be configured of hardware (for example, DSP (digital signal processor)) other than the main processor 140.

The display control unit 147 generates a control signal to control the right display unit 22 and the left display unit 24, and with this control signal, controls the generation and emission of image light by each of the right display unit 22 and the left display unit 24. Specifically, the display control unit 147 controls the OLED drive circuits 225, 245 so as to cause the OLED panels 223, 243 to display an image. Based on a signal outputted from the image processing unit 145, the display control unit 147 controls the timing when the OLED drive circuits 225, 245 cause the OLED panels 223, 243 to display an image, and controls the luminance of the OLED panels 223, 243, or the like.

The detection control unit 149 controls the camera 61 to generate picked-up image data. The generated picked-up image data is temporarily stored in the storage unit 122.

The detection control unit 149 reads out the picked-up image data from the storage unit 122 and detects an operation by a pointing element, based on the picked-up image data thus read out. In this embodiment, a hand or finger of the user (hereinafter the hand and finger are collectively referred to as hand-finger) is detected as a pointing element. The operation detected by the detection control unit 149 includes the shape and position of the hand-finger of the user picked up in the picked-up image data.

The detection control unit 149 detects an area where the hand-finger is picked up (hereinafter referred to as picked-up image area) from the picked-up image data. For example, the detection control unit 149 extracts an area of skin color from the picked-up image data by skin color extraction processing, then compares the pixel value in the extracted area of skin color with a preset threshold value by threshold processing, and thus detects a hand-finger area. The detection control unit 149 may also extract the contour of the hand-finger area by edge detection processing, then compare a feature point based on irregularities of the extracted contour with the feature point of each hand sign registered in advance as the dictionary data 125, and thus determine the shape and position of the hand-finger or whether it is the left hand or the right hand.

The detection control unit 149 outputs the information thus detected to the operation control unit 151, as detected information. The detected information includes range information showing the range (horizontal range and vertical range) of the hand-finger area, and position information showing the position (for example, the position of the fingertip) of each finger. The range information and the position information is, for example, information showing coordinates on a coordinate system where the origin is set at the top left of the picked-up image data, the horizontal direction is the X-axis direction, and the vertical direction is the Y-axis direction. The detected information also includes information showing the shape of the hand-finger, and information indicating whether the detected hand-finger area is the hand-finger of the left hand or the hand-finger of the right hand.

If an image in which a hand-finger of the user is picked up is not detected from the picked-up image data, the detection control unit 149 outputs information indicating that no hand-finger is detected, as detected information, to the operation control unit 151.

The detected information and the picked-up image data are inputted to the operation control unit 151 from the detection control unit 149.

The operation control unit 151 determines whether to display a display object in a display area DA or not, if a operation that serves as a preset trigger is detected. If it is determined that a display object needs to be displayed, the operation control unit 151 causes the display object to be displayed in the display area DA. The display object includes an image of a hand-finger of the user picked up by the camera 61 and a contour image showing apart or the entirety of the contour of a hand-finger area generated by the operation control unit 151. The operation control unit 151 in this embodiment causes an image of the hand-finger area sliced out of the picked-up image data picked up by the camera 61 to be displayed as a display object. The display area DA is an area where the image display unit 20 can display an image. Specifically, the display area DA is the areas where the half mirrors 261, 281 shown in FIG. 3 are arranged. The half mirrors 261, 281 are members which reflect the image light L emitted from the OLED panels 223, 243 and cause the image light L to become incident on the right eye RE and the left eye LE. Therefore, the areas where the half mirrors 261, 281 are arranged correspond to the display area DA.

In this embodiment, the case where, as the operation serving as a trigger, the user opens the palm of one hand toward the user's face, is described. That is, the operation control unit 151 determines that the operation serving as a trigger is detected, if an image showing a hand of the user with the palm open is detected from the picked-up image data picked up by the camera 61.

The reason why the image pickup of the palm of the hand instead of the back of the hand is set as a trigger is that, when the user wearing the image display unit 20 carries out work with a hand, an image of the back of the hand is likely to be picked up by the camera 61. That is, this is to prevent a display object from being displayed against the user's intention.

Also, it is possible to set, as a preset trigger, the case where one of the operation button 11 of the operation unit 110 is pressed, or the case where the user moves the head up and down (nod) or left and right (shake the head). In the description below, the hand whose image is picked up by the camera 61 and which is recognized by the operation control unit 151 as the operation serving as a preset trigger is referred to as a "first hand". The first hand may be the left hand or the right hand of the user. The first hand is equivalent to the "pointing element" according to the invention.

When the operation serving as a trigger is detected, the operation control unit 151 determines, for example, whether the right electronic shade 227 and the left electronic shade 247 are driven or not, and determines whether to display a display object or not. When the right electronic shade 227 and the left electronic shade 247 are in the driven state, the transmittance of external field light transmitted through the image display unit 20 is restrained to a low level and the rate of the external field light reaching the eyes of the user drops. Therefore, it is difficult for the user wearing the image display unit 20 to visually recognize the external field. Also, when the right electronic shade 227 and the left electronic shade 247 are in the driven state, it is highly likely that a dynamic image or still image (dynamic image and still image are collectively referred to as a display image) is displayed by the image display unit 20. Since the transmittance of the external field light in the image display unit 20 is restrained to a low level, the visibility of the image light of the display image displayed by the image display unit 20 increases. In the state where the display image is displayed by the image display unit 20, the visibility of the external field is restrained to a low level and the user may not be able to see his/her own hand. Therefore, the operation control unit 151 causes a display object to be displayed in the display area DA and detects an operation by the user to the display object.

The operation control unit 151 may also cause a display object to be displayed in the case where the luminance of the image displayed by the image display unit 20 is lower than the luminance of the external field light or in the case where the degree of similarity in color between an object present in the external field and the image displayed by the image display unit 20 is high. The luminance of the external field light can be detected by the camera 61. Also, a light sensor may be separately provided in the HMD 100.

The operation control unit 151 sets the determination on whether to display a display object in the display area DA or not, based on the transmittance of the right electronic shade 227 and the left electronic shade 247 in the driven state.

For example, if the transmittance of the right electronic shade 227 and the left electronic shade 247 is equal to or lower than a preset transmittance, the operation control unit 151 determines that the transmittance of the external field light is restrained to a low level and that it is difficult for the user to visually recognize the external field. In this case, the operation control unit 151 causes a display object to be displayed in the display area DA.

The operation control unit 151 may also determine that a display object is to be displayed in the display area DA, in the case where a display image is displayed by the image display unit 20. As described above, in the state where a display image is displayed by the image display unit 20, the visibility of the external field drops. Therefore, when a display image is displayed in the display area, the operation control unit 151 determines that a display object is to be displayed in the display area DA.

Also, in the case where a display image is displayed in the display area DA, the operation control unit 151 may also determine whether to display a display object or not, based on the position or size of the display image in the display area DA. For example, if a small display image is displayed in one of the four corners of the display area DA, the user can visually recognize the external field even in the state where the display image is displayed. Therefore, the operation control unit 151 does not cause a display object to be displayed if the size of the display image displayed in the display area DA is smaller than a preset size or if the display position of the display image is outside of a preset area including the center of the display area DA. On the other hand, the operation control unit 151 causes a display object to be displayed if the size of the display image is equal to or greater than the preset size or if the display image is displayed within the preset area including the center of the display area DA.

If it is determined that a display object is to be displayed, the operation control unit 151 slices out image data of the hand-finger area of the first hand from the picked-up image data, based on the detected information inputted from the detection control unit 149. The operation control unit 151 causes the image display unit 20 to display the image data of the hand-finger area thus sliced out, as a hand-finger image 305. The hand-finger image 305 is equivalent to the "display object" according to the invention.

The operation control unit 151 may also generate a contour image showing the contour of the hand-finger area based on the detected information inputted from the detection control unit 149 and cause the image display unit 20 to display the generated contour image. This contour image may be an image showing the contour of the entire hand-finger area or may be an image showing the contour of a part of the hand-finger area (for example, only the fingers or only the palm).

When a display image (for example, a dynamic image or still image) is displayed by the image display unit 20, the hand-finger image 305 as a display object displayed by the operation control unit 151 may be displayed in the display area DA in such a way as not to overlap this display image. Also, when the hand-finger image 305 is displayed in such a way as to partly or entirely overlap the display image displayed by the image display unit 20, the brightness of the hand-finger image 305 may be made higher than the display image. If the display image is a dynamic image, the playback of the dynamic image may be stopped.

The position in the display area DA where the hand-finger image 305 or the contour image are displayed by the operation control unit 151 is the position corresponding to the hand-finger of the user picked up in the picked-up image data.

By calibration executed in advance by the operation control unit 151, a correspondence is established between coordinates on the display area DA and coordinates on the picked-up image picked up by the camera 61. For example, the operation control unit 151 causes the image display unit 20 to display a preset marker at a preset position in the display area DA. The user recognizes the marker displayed by the image display unit 20, places a fingertip at the position of the displayed marker, and presses one of the operation buttons 11 or the like of the operation unit 110. When the press operation on the operation button 11 is accepted, the control unit 150 causes the camera 61 to execute image pickup, and acquires picked-up image data picked up by the camera 61. The detection control unit 149 detects the hand-finger area from the acquired picked-up image data and specifies the position of the fingertip on the picked-up image data. Based on the position of the fingertip specified by the detection control unit 149, the operation control unit 151 finds the correspondence between the coordinates on the display area DA where the marker is displayed and the coordinates on the picked-up image data showing the specified position of the fingertip. Also, the operation control unit 151 carries out the foregoing processing a plurality of times, changing the position where the marker is displayed, and thus generates a conversion parameter to convert coordinates on the picked-up image data into coordinates on the display area DA.

FIGS. 6 to 12 show images displayed in the display area DA.

FIGS. 6 to 12 show the state where the hand-finger image 305 sliced out of the picked-up image data is displayed in the display area DA. Although a display image is displayed in the display area DA, too, the illustration of the display image is omitted.

When the operation control unit 151 causes the hand-finger image 305 of the first hand to be displayed in the display area DA, the operation control unit 151 causes a function display image 310 to be displayed corresponding to the fingers or the like in this hand-finger image 305. The function display image 310 is an image showing information that specifies a function. The function in this case is a function realized by the control unit 150 executing an application program. If the application program is, for example, a display program for a display image, the function includes pause, stop, play, rewind, fast forward and the like. The function display image 310 is equivalent to the "image that specifies processing" according to the invention.

Figure 6:
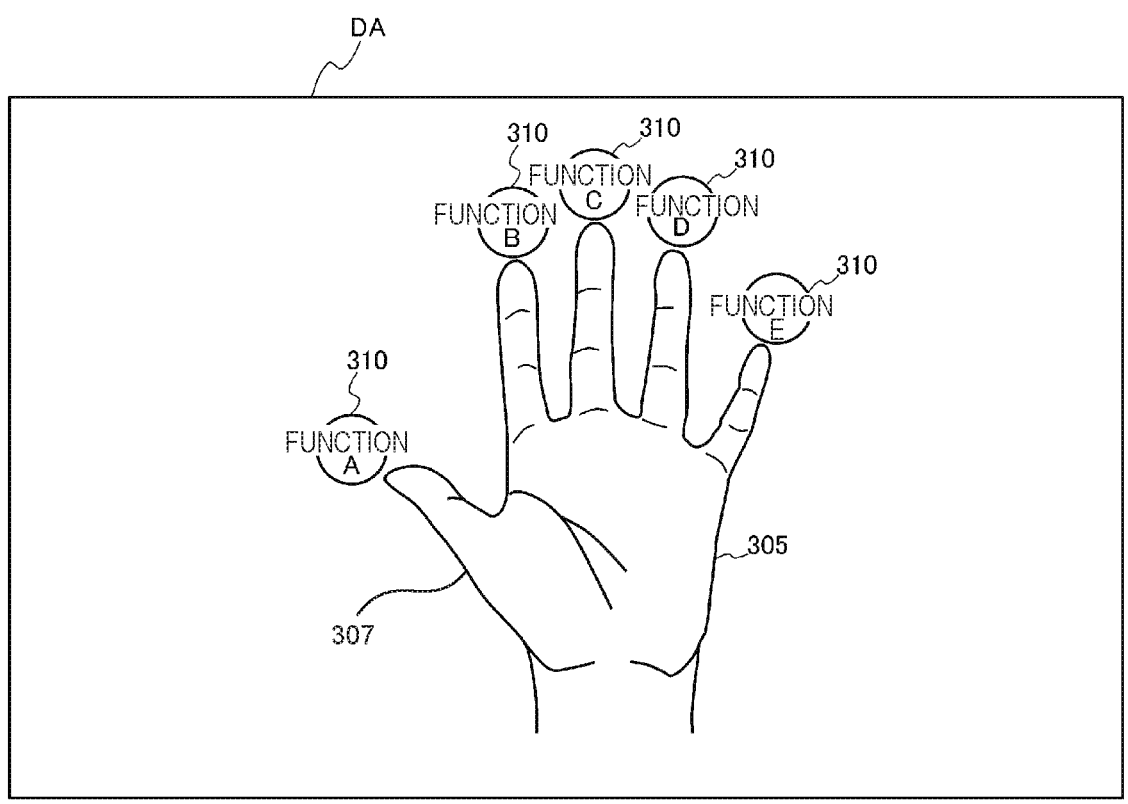
FIG. 6 shows an image displayed in a display area.
Figure 7:
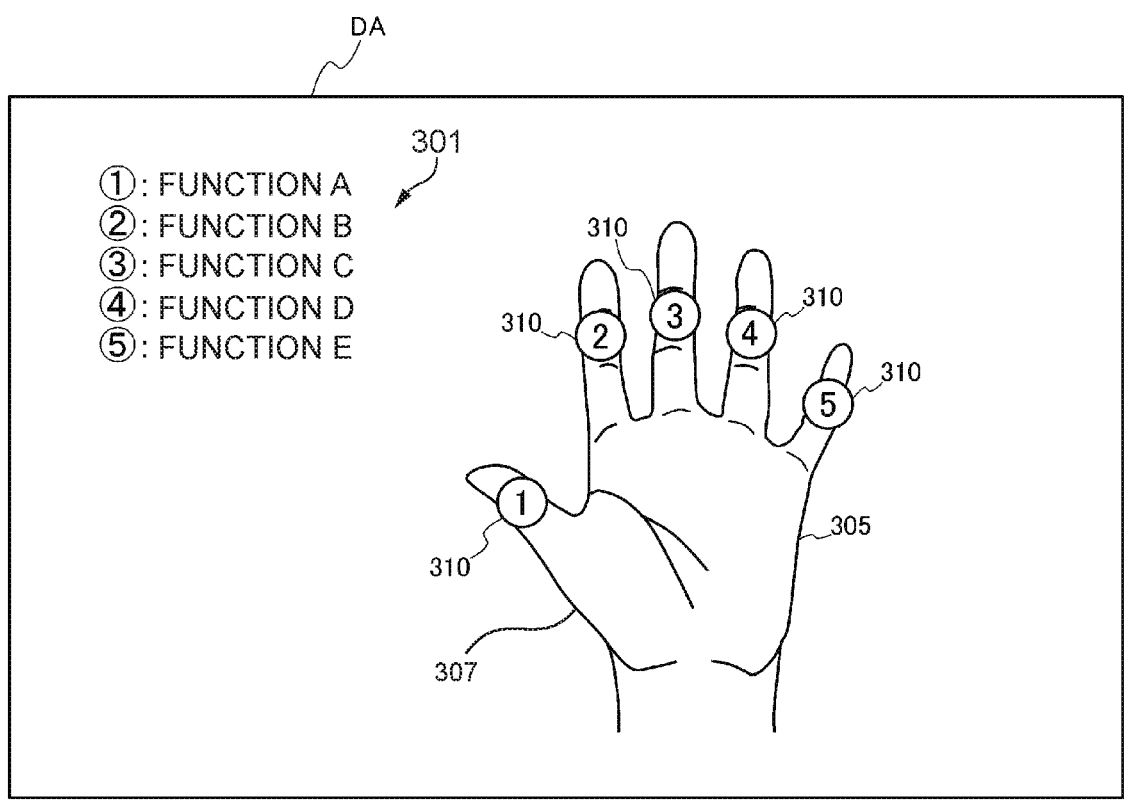
FIG. 7 shows an image displayed in the display area.
Figure 8:
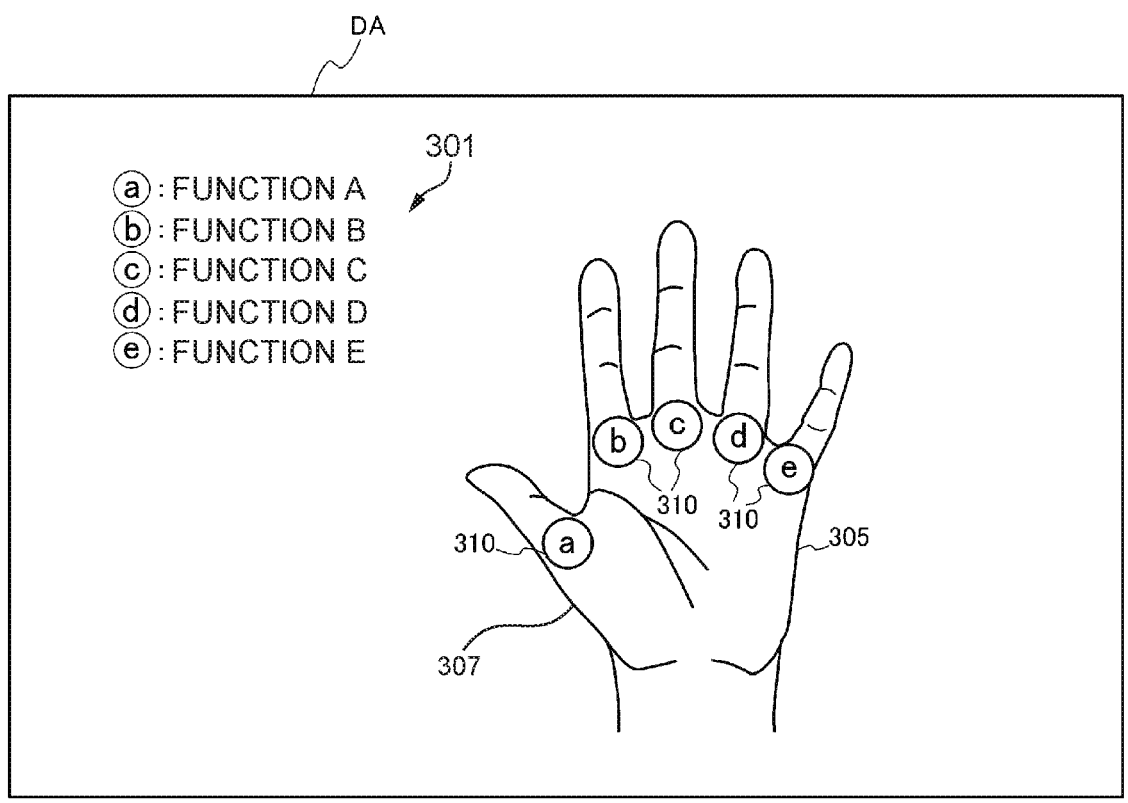
FIG. 8 shows an image displayed in the display area.

FIGS. 6 to 8 show the state where the function display image 310 is displayed corresponding to the image of the first hand.

The information that specifies a function displayed in the function display image 310 may be, for example, an image showing the name of the function (function name) or may be identification information such as a number or alphabet letter corresponding to the function. If identification information such as a number is used as the information that specifies a function, an image (hereinafter referred to as a correspondence display image) 301 showing the correspondence between the function and the identification information may be displayed separately.

For example, FIG. 6 shows the state where an image of a function A is displayed as a function name at the fingertip (site) of the thumb in an image of the left hand, where an image of a function B is displayed as a function name at the fingertip (site) of the forefinger, and where an image of a function C is displayed as a function name at the fingertip (site) of the middle finger. Also, FIG. 6 shows the state where an image of a function D is displayed as a function name at the fingertip (site) of the third finger in the image of the left hand, and where an image of a function E is displayed as a function name at the fingertip (site) of the little finger. Meanwhile, FIG. 7 shows the state where images of identification numbers as function display images 310 are displayed corresponding to the respective fingers (sites) in the image of the left hand. FIG. 8 shows the state where images of alphabet letters as function display images 310 are displayed corresponding to the base parts (sites of the respective fingers, on the palm in the image of the left hand. The display position of the function display image 310 is not limited to those shown in FIGS. 6 to 8 and may be any position on the hand of the user or on the image of the hand. Also, the display position may be a position apart from the hand or the image of the hand, provided that it is possible to recognize that the function display image 310 corresponds to a site on the hand.

When a display object is not displayed in the display area DA, the operation control unit 151 causes the function display image 310 to be displayed at a position corresponding to the fingertip of each finger of the first hand, based on the detected information inputted from the detection control unit 149.

While the case where the function display image 310 is displayed at the fingertips of the first hand is described in this embodiment, the position where the function display image 310 is displayed may be on the fingers or on the palm, as in the case where an image of the first hand is displayed.

Figure 9:
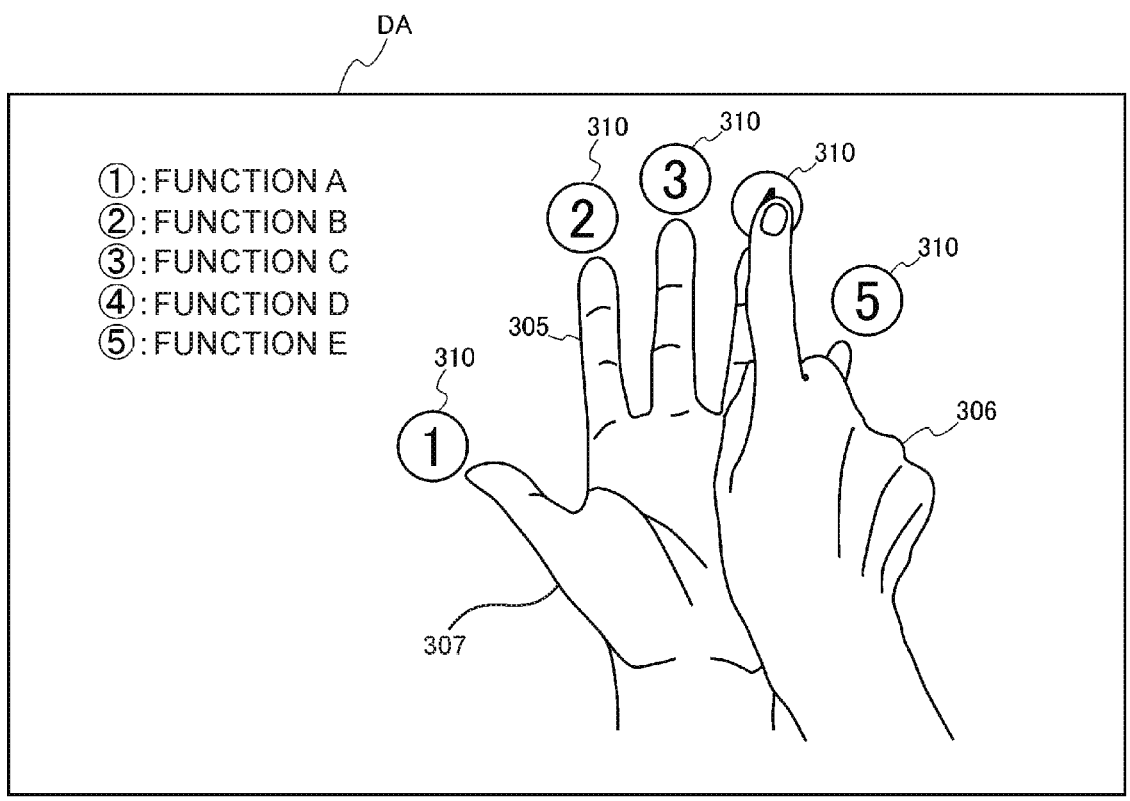
FIG. 9 shows an image displayed in the display area.

FIG. 9 shows a method of selecting a function.

The user carries out an operation (hereinafter referred to as a selection operation) in which, in the state where the palm of the first hand faces the user as shown in FIGS. 6 to 8, a finger of the other hand (hereinafter referred to as a second hand) is placed on top of one of the function display images 310 as shown in FIG. 9. The second hand is equivalent to the "sub-pointing element" according to the invention. FIG. 9 shows the state where five function display images 310 showing five identification numbers of 1 to 5 are displayed are displayed are displayed at the fingertips of the respective fingers in the image of the first hand. The user carries out the selection operation, placing a finger of the right hand as the second hand on top of the function display image 310 of the identification number corresponding to the function to be selected. Although the case where the first hand is the left hand and where the second hand is the right hand is described in this embodiment, the right hand may be the first hand and the left hand may be the second hand. Also, the first hand and the second hand may be set based on the distance between the user and the hands. For example, the hand that is farther from the user (that is, the camera 61 of the image display unit 20) may be the first hand, and the hand that is closer to the user may be the second hand. The distance from the camera 61 of the image display unit 20 can be determined based on the size of the hands picked up in the picked-up image data. Also, a distance sensor may be provided in the image display unit 20 of the HMD 100 and the distance from the left hand of the user and the distance from the right hand of the user may be found respectively by this distance sensor. Moreover, the camera 61 may be configured as a stereo camera and the distance to each hand may be detected based on the principle of triangulation using picked-up image data of two images picked up by the camera 61.

As in the case of the first hand, the operation control unit 151 slices out image data of the hand-finger area of the secondhand from the picked-up image data. The operation control unit 151 causes the image display unit 20 to display the image data of the hand-finger area thus sliced out, as a hand-finger image 306.

When the hand-finger image 305 of the first hand and the function display images 310 are displayed in the display area DA, the operation control unit 151 instructs the detection control unit 149 to carry out image pickup by the camera 61. As the instruction from the operation control unit 151 is inputted to the detection control unit 149, the detection control unit 149 causes the camera 61 to execute image pickup. The detection control unit 149 then detects the range of the hand-finger area, the position of each finger, the shape of the hand-finger, and whether the hand-finger area is of the left hand or the right hand, based on the resulting picked-up image data, and outputs the information thus detected to the operation control unit 151 as detected information.

The operation control unit 151 determines the function display image 310 selected by the user, based on the detected information inputted from the detection control unit 149. The position of the first hand recognized as an operation that serves as a trigger is fixed. Therefore, with respect to the position of the first hand detected by the detection control unit 149, too, no change is detected or only a change within a predetermined range is detected. The operation control unit 151 determines whether or not the function display image 310 is displayed at the position in the display area DA that corresponds to the position of the fingertip of the second hand picked up in the picked-up image data. If the function display image 310 is not displayed at the position in the display area DA that corresponds to the position in the picked-up image data where the fingertip of the second hand is detected, the operation control unit 151 determines that the function display image 310 is not selected. Meanwhile, if the function display image 310 is displayed at the position in the display area DA that corresponds to the position in the picked-up image data where the fingertip of the second hand is detected, the operation control unit 151 determines that the function corresponding to the function display image 310 displayed at this position is selected.

When the function display image 310 is selected, the operation control unit 151 causes the selected function display image 310 to flash on and off. The operation control unit 151 may also change the display color of the selected function display image 310 to a different color from the display color of the other function display images 310, or may change the brightness of the selected function display image 310 to a different brightness from the brightness of the other function display images 310. By causing the function display image 310 to flash on and off, changing the display color, or changing the brightness of the image, it is possible to notify the user of the function display image 310 that is determined as selected.

If the function display image 310 of the function selected by the secondhand does not flash on and off, the user carries out the selection operation again in which a finger of the second hand is placed on top of the function display image 310. Meanwhile, if the function display image 310 of the selected function flashes on and off, the user changes the shape of the first hand to a preset shape in order to confirm the selection operation.

Figure 10:
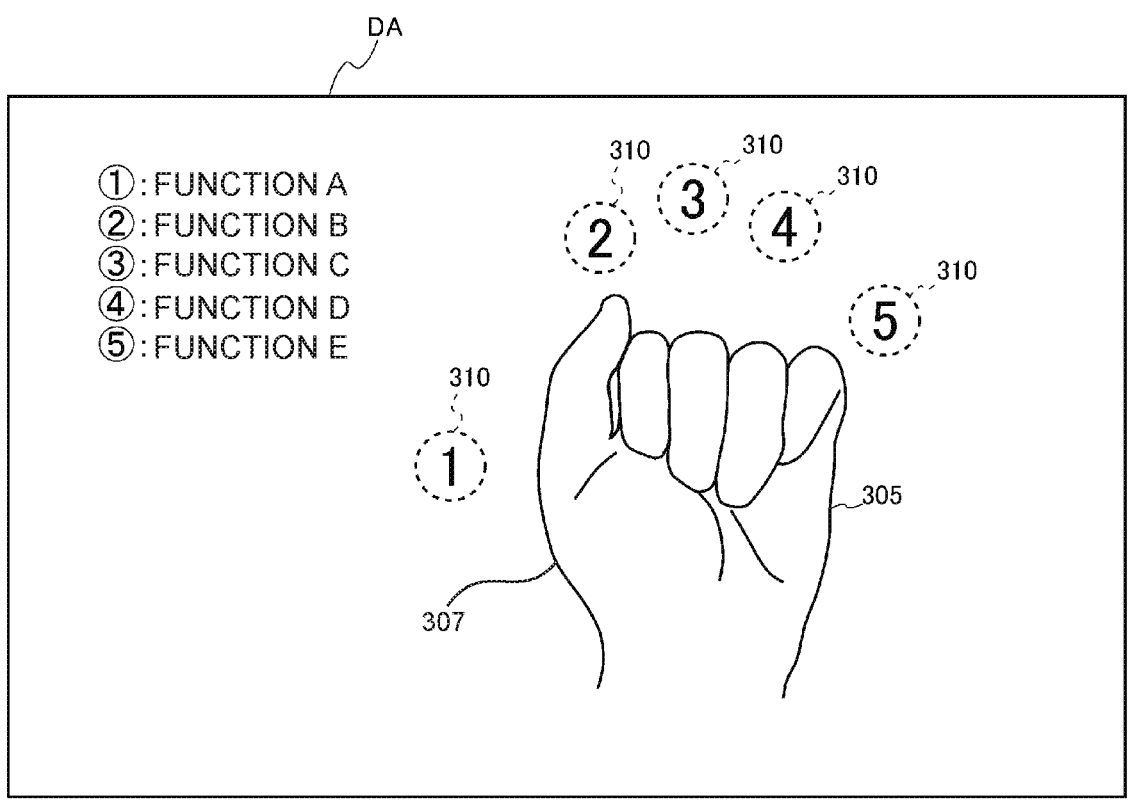
FIG. 10 shows an image displayed in the display area.

The user changes the shape of the left hand as the first hand to a preset shape in order to confirm the selection operation. For example, in an operation that serves as a trigger, the user changes the palm recognized in an open state to a closed state (that is, "rock" as in rock-paper-scissors), or sticks up the two fingers of the forefinger and the middle finger (so-called "scissors"). The shape of the hand in this case is a preset shape and can be arbitrarily changed by the user. FIG. 10 shows the state where the hand is closed, as a preset shape.

The operation control unit 151 instructs the detection control unit 149 to carry out image pickup by the camera 61, and determines whether the shape of the first hand is changed to the preset shape or not, based on the detected information inputted from the detection control unit 149.

The detection control unit 149 or the operation control unit 151 determines whether the shape of the first hand is changed to the preset shape or not, referring to the dictionary data 125 in the storage unit 122. If it is determined that the shape of the first hand is changed to the preset shape, the operation control unit 151 determines that the selection operation is confirmed, and instructs the display control unit 147 or the image processing unit 145 to execute the function corresponding to the function display image 310 flashing on and off.

The operation control unit 151 has an operation mode and a setting mode, as its operating modes.

The operation mode is a mode in which the function display images 310 corresponding to the fingertips of the first hand or the image of the first hand are displayed and in which the function indicating the function display image 310 selected by the selection operation with the second hand is executed. The setting mode is a mode in which the function display images 310 corresponding to the fingertips of the first hand or the image of the first hand are changed.

Figure 11:
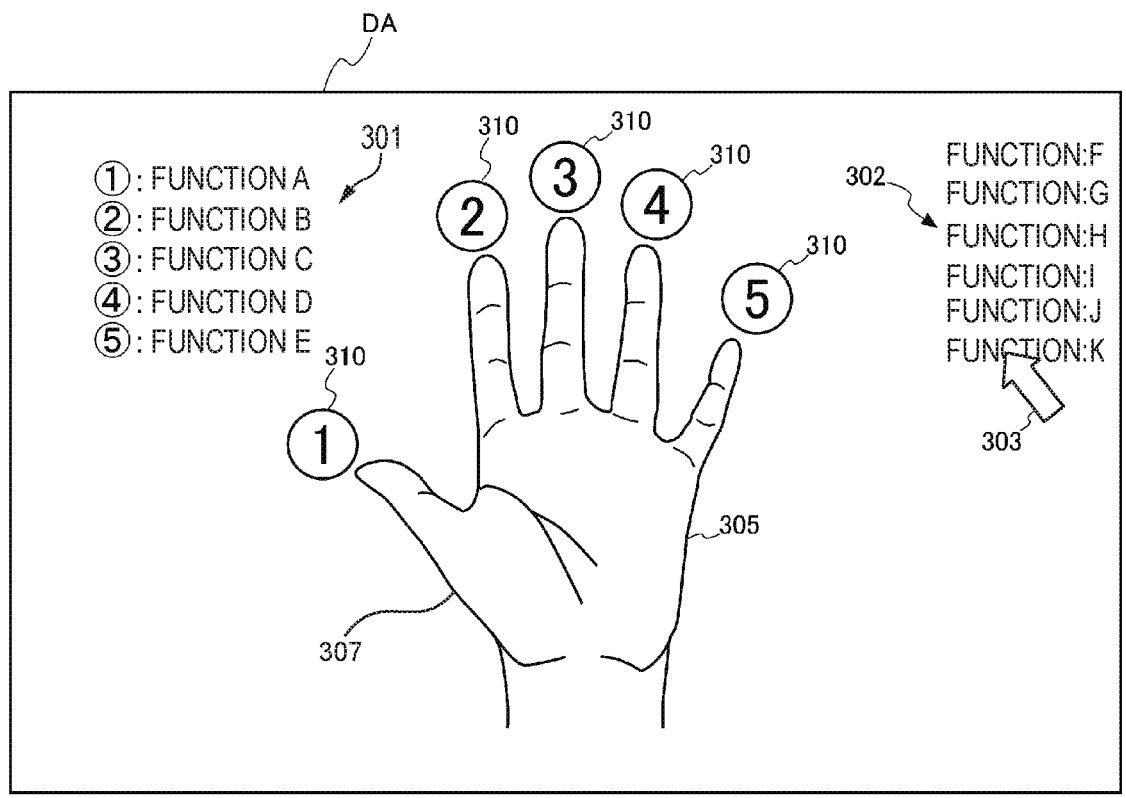
FIG. 11 shows an image displayed in the display area.
Figure 12:
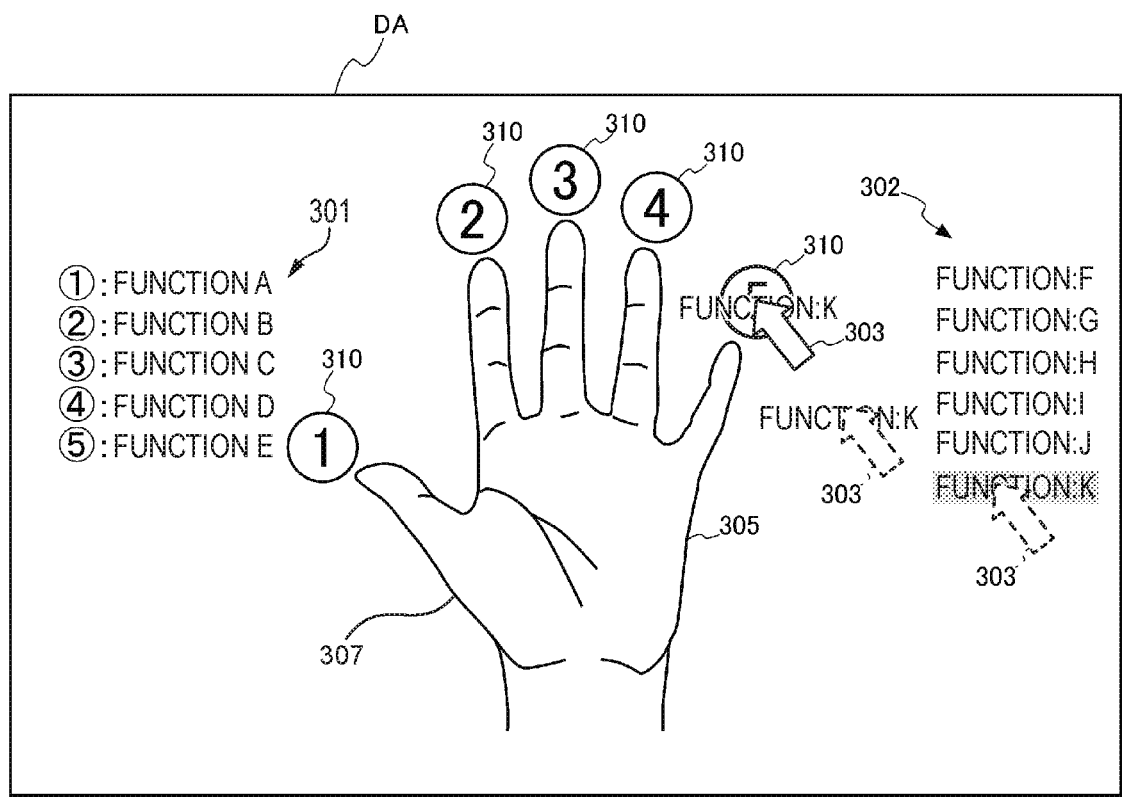
FIG. 12 shows an image displayed in the display area.

FIGS. 11 and 12 explain the setting mode.

When a preset operation is inputted, the operation control unit 151 causes the function display images 310 showing the functions set for the respective fingers to be displayed at the fingertips of the first hand or the image of the first hand. The operation control unit 151 also causes an image (hereinafter referred to as a list display image) 302 to be displayed in the display area DA, the list display image 302 showing a list of functions executable by the control unit 150 and not corresponding to any finger of the first hand. FIG. shows the display area DA and the state where the corresponding function display images 310 are displayed at the fingertips of the first hand or the image of the first hand. In the display area DA shown in FIG. 11, the correspondence display image 301 and the list display image 302 are displayed.

The user operates the track pad 14 with the second hand and thus moves a pointer 303 to the position where a function name to be selected is displayed. After moving the pointer 303 to the position where the function name to be selected is displayed, the user firmly presses the operation surface of the track pad 14 with a different pressing force from when the pointer 303 is moved. Thus, the function name displayed at the position of the pointer 303 is selected. FIG. 12 shows the state where a function K is selected.

Next, the user moves a finger of the second hand on the track pad 14 and thus moves the pointer 303 to the display position of the function display image 310 whose corresponding function is to be changed. At this time, as shown in FIG. 12, the image of the selected function name, too, is moved with the movement of the pointer 303 (drag operation).

After moving the image showing the function name to the display position of the function display image 310 whose function is to be changed, the user caries out a drop operation by moving the finger of the second hand away from the track pad 14. With this drop operation, the function corresponding to the function display image 310 selected by the user is changes to the function corresponding to the image of the function name selected by the user. In the example shown in FIG. 12, the function corresponding to the function display image 310 showing a number "5" is changed from the function E to the function K.

Figure 13:
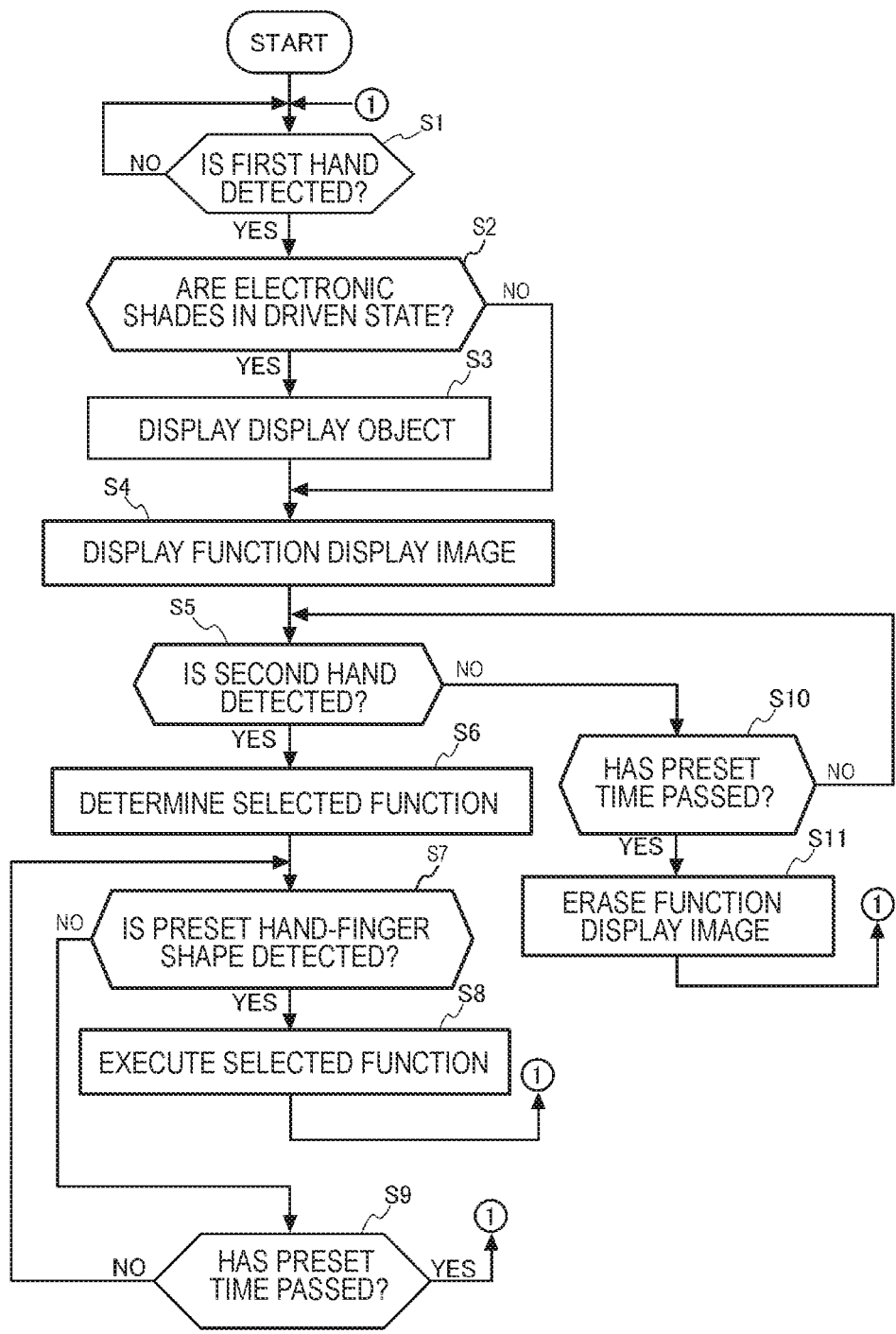
FIG. 13 is a flowchart showing the operation of the HMD.

FIG. 13 is a flowchart showing the operation of the control unit 150.

The control unit 150 causes the camera 61 to execute image pickup and reads out picked-up image data picked up by the camera 61 from the storage unit 122. The control unit 150 determines whether or not an image of the first hand is picked up in the picked-up image data thus read out, and determines whether an operation that serves a trigger is inputted or not (Step S1). The image of the first hand detected at this point is an image in which a palm is picked up, and this image may be an image of the left hand or an image of the right hand.

If an image of the first hand is not detected from the picked-up image data (NO in Step S1), the control unit 150 waits until an image of the first hand is detected. If an image of the first hand is detected (YES in Step S1), the control unit 150 determines whether the right electronic shade 227 and the left electronic shade 247 are in the driven state or not (Step S2).

If it is determined that the right electronic shade 227 and the left electronic shade 247 are not in the driven state (NO in Step S2), the control unit 150 specifies the position of each finger of the first hand, based on the picked-up image data. The control unit 150 then causes the function display image 310 corresponding to each finger to be displayed at the fingertip of each finger of the first hand thus specified (Step S4).

Meanwhile, if it is determined that the right electronic shade 227 and the left electronic shade 247 are in the driven state (YES in Step S2), the control unit 150 slices out a hand-finger image 305 that is an image in which the hand-finger area of the first hand is picked up, from the picked-up image data. The control unit 150 causes the hand-finger image 305, thus sliced out, to be displayed as a display object in the display area DA (Step S3). The control unit 150 then causes the function display image 310 corresponding to each finger to be displayed at the fingertip of each finger in the hand-finger image 305 (Step S4).

Next, the control unit 150 causes the camera 61 to execute image pickup and determines whether an image of the second hand is picked up in picked-up image data picked up by the camera 61 or not (Step S5). If it is determined that an image of the second hand is not picked up (NO in Step S5), the control unit 150 determines whether a preset time has passed after the function display image 310 is displayed in the display area DA or not (Step S10). If the preset time has not passed (NO in Step S10), the control unit 150 returns to the determination of Step S5 and determines whether an image of the second hand is picked up in the picked-up image data or not.

Meanwhile, if it is determined that the preset time has passed (YES in Step S10), the control unit 150 erases the display of the function display image 310 displayed in the display area DA (Step S11) and returns to the determination of Step S1.

If an image of the second hand is picked up in the picked-up image data (YES in Step S5), the control unit 150 determines the function displayed at the display position in the display area DA corresponding to the fingertip of the second hand picked up in the picked-up image data (Step S6). Next, the control unit 150 causes the camera 61 to execute image pickup and determines whether or not an image of the first hand in a preset shape is detected from picked-up image data picked up by the camera 61 (Step S7). For example, the control unit 150 determines whether an image of the first hand in the closed state is picked up or not. If it is determined that an image of the first hand in the preset shape is not picked up in the picked-up image data (NO in Step S7), the control unit 150 determines whether a preset time has passed or not (Step S9). If the preset time has not passed (NO in Step S9), the control unit 150 returns to the determination of Step S7 and determines whether an image of the preset shape is picked up or not (Step S7). If the preset time has passed (YES in Step S9), the control unit 150 erases the display of the function display image 310 displayed in the display area DA and returns to the determination of Step S1.

Meanwhile, if an image of the first hand in the preset shape is detected from the picked-up image data (YES in Step S7), the control unit 150 determines that the function corresponding to the function display image 310 determined in Step S6 is selected. The control unit 150 notifies the display control unit 147 or the image processing unit 145 to execute this selected function (Step S8).

Figure 14:
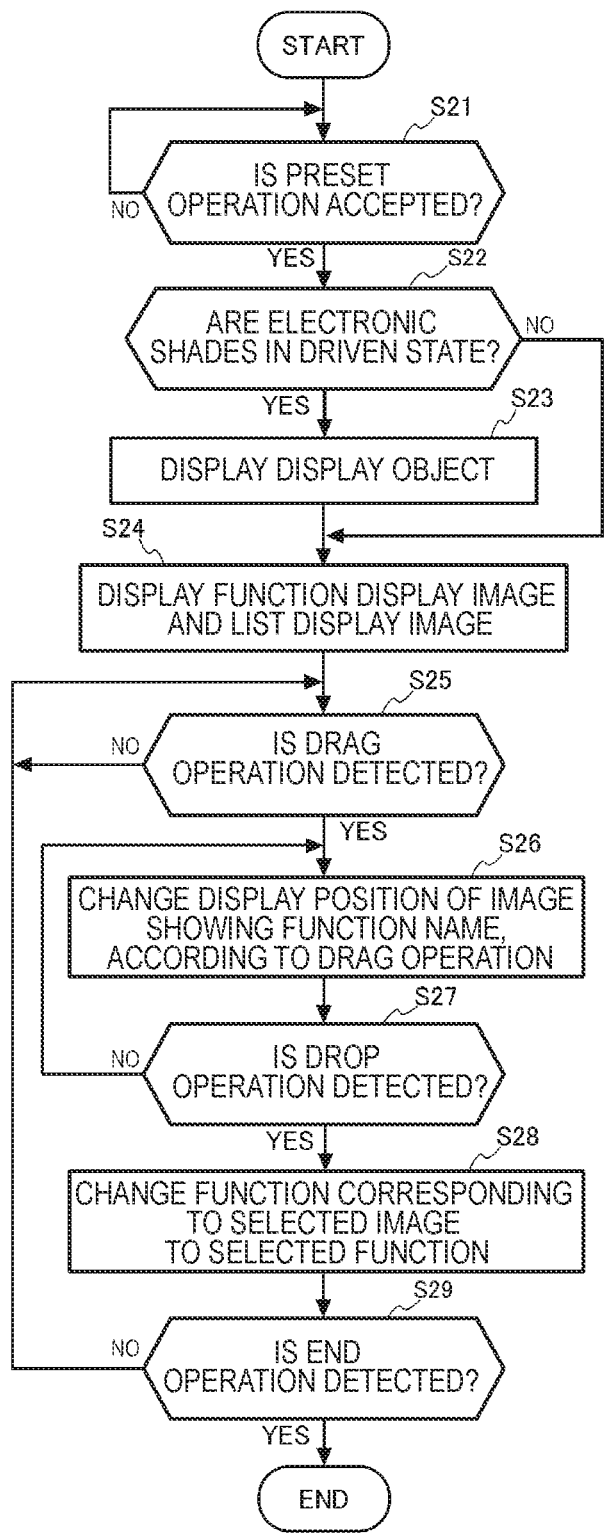
FIG. 14 is a flowchart showing the operation of the HMD.

FIG. 14 is a flowchart showing procedures of a function change operation.

First, the control unit 150 determines whether a preset operation is accepted or not (Step S21). This operation may be an operation on the operation button 11 of the operation unit 110 or may be an operation in which the user moves the head up and down (nod) or left and right (shake the head).

If the preset operation is not accepted (NO in Step S21), the control unit 150 waits until the preset operation is accepted. Meanwhile, if the preset operation is accepted (YES in Step S21), the control unit 150 determines whether the right electronic shade 227 and the left electronic shade 247 are in the driven state or not (Step S22).

If the right electronic shade 227 and the left electronic shade 247 are not in the driven state (NO in Step S22), the control unit 150 specifies the position of each finger of the first hand picked up in the picked-up image data. The control unit 150 then causes the function display image 310 corresponding to each finger to be displayed at the fingertip of each finger of the first hand thus specified, and also causes a list display image showing a list of executable functions to be displayed (Step S24).

Meanwhile, if it is determined that the right electronic shade 227 and the left electronic shade 247 are in the driven state (YES in Step S22), the control unit 150 slices out a hand-finger image 305 that is an image of the hand-finger area of the first hand, from the picked-up image data. The control unit 150 causes the hand-finger image 305, thus sliced out, to be displayed as a display object in the display area DA. The control unit 150 also causes the function display image 310 corresponding to each finger to be displayed at the fingertip of each finger in the hand-finger image 305, and causes a list display image 302 to be displayed, the list display image 302 showing a list of functions executable by the control unit 150 (Step S24).

Next, the control unit 150 determines whether a drag operation on the track pad 14 is detected or not (Step S25). If a drag operation is not detected (NO in Step S25), the control unit 150 waits until a drag operation is detected. Meanwhile, if a drag operation is detected (YES in Step S25), the control unit 150 changes the display position of the image showing the function name selected by this drag operation, to the position corresponding to the operation position of the drag operation (Step S26).

Next, the control unit 150 determines whether a drop operation is detected or not (Step S27). If a drop operation is not detected (NO in Step S27), the control unit 150 returns to the processing of Step S26 and changes the display position of the image showing the function name to the position corresponding to the operation position of the drag operation.

Meanwhile, if a drop operation is detected (YES in Step S27), the control unit 150 determines the function corresponding to the function display image 310 displayed at the position where the drop operation is made. The control unit 150 then changes the function corresponding to the function display image 310 to the function of the function name selected by the drag operation (Step S28). Next, the control unit 150 determines whether an operation set as an end operation is accepted or not (Step S29). For example, if a press operation in which one of the operation buttons 11 of the operation unit 110 is pressed is set as an end operation, the control unit 150 determines whether this press operation on the operation button 11 is detected or not. If the press operation on the operation button 11 is detected (YES in Step S29), the control unit 150 ends this processing flow. If the press operation on the operation button 11 is not detected (NO in Step S29), the control unit 150 returns to Step S25 and resumes the detection of a drag operation.

As described above, in this embodiment, the image display unit 20, the camera 61, the detection control unit 149, and the operation control unit 151 are provided. The image display unit 20 is mounted on the head of the user and displays an image in such a way that the user can visually recognize the external scene. The detection control unit 149 detects an operation by a hand, based on a picked-up image picked up by the camera 61. The operation control unit 151 controls the image on the image display unit 20, based on the operation detected by the detection control unit 149. Also, if a hand is detected from the picked-up image picked up by the camera 61, the operation control unit 151 causes the image display unit 20 to display an image of the hand showing at least one of the position and shape of the hand.

Therefore, even when the image display unit 20 displays an image, the user can be allowed to recognize the position or shape of the hand while the visibility of this image is maintained.

The image display unit 20 displays an image as superimposed on the external scene visually recognized by the user. The camera 61 picks up an image over a range including at least a part of the external scene visually recognized by the user. The operation control unit 151 causes an image of the hand to be displayed at the position corresponding to the position where the user visually recognizes the hand in the external scene.

Therefore, the displayed image of the hand enables the user to recognize the position of the hand.

In the embodiment, the image display unit 20 is configured to be able to transmit external light and has the right electronic shade 227 and the left electronic shade 247 that adjust the transmittance of external light transmitted through the image display unit 20. The operation control unit 151 switches between display and non-display of the image of the hand, based on the transmittance of external light adjusted by the right electronic shade 227 and the left electronic shade 247.

Thus, in the case where the transmittance of external light is restrained to a low level by the right electronic shade 227 and the left electronic shade 247 and the visibility of the external field is lowered, displaying the image of the hand enables the user to recognize the state of the hand.

The operation control unit 151 also switches between display and non-display of the image of the hand, based on the size of the image displayed by the image display unit 20.

Thus, the image of the hand can be displayed in the case where it is determined that the visibility of the external field drops because the size of the image displayed by the image display unit 20 is large.

The detection control unit 149 detects an operation with the combination of the left hand and the right hand, based on the picked-up image data picked up by the camera 61. Thus, the image on the image display unit 20 can be controlled by the operation with the combination of the left hand and the right hand.

The operation control unit 151 causes the function display image 310 specifying processing executable by the operation control unit 151 to be displayed, corresponding to a site on the hand or a site on the image of the hand.

The operation control unit 151 determines a site selected based on a pointed position of the second hand (right hand) on the first hand (left hand) or the image of the first hand (left hand) detected by the detection control unit 149, and executes processing corresponding to the determined site.

Thus, by changing the pointed position of the second hand on the first hand or the image of the first hand, it is possible to select the function display image 310 corresponding to the site on the first hand or the image of the first hand. Also, it is possible to cause the HMD 100 to execute processing corresponding to the selected function display image 310.

The operation control unit 151 causes the function display image 310 to be displayed as superimposed on the hand or the image of the hand, or causes the function display image 310 to be displayed around the hand or the image of the hand.

Thus, the selection of the function display image 310 can be easily carried out by the operation with the combination of the left hand and the right hand.

The image of the hand is an image of the hand of the user picked up by the camera 61, or an image showing a part or the entirety of the contour of the hand.

Thus, even when the user cannot see the hand due to the image displayed by the image display unit 20, it is possible to allow the user to recognize the image of the hand or the contour of the hand, and enable the user to execute an operation using the hand.

In the embodiment, the operation control unit 151 switches between and executes the operation mode, in which the function corresponding to the site on the hand or the image of the hand selected by the operation detected by the detection control unit 149 is executed, and the setting mode, in which the function corresponding to the site on the hand or the image of the hand is set.

Thus, the function corresponding to the site on the hand or the image of the hand can be changed by the setting mode. Also, by the operation mode, it is possible to cause HMD 100 to execute the processing corresponding to the site on the hand or the image of the hand.

The above embodiment is a preferred embodiment of the invention. However, the invention is not limited to this and can be carried out in various other forms without departing from the scope of the invention.

For example, in the embodiment the case where a hand of the user is used as the pointing element is described. However, the pointing element is not limited to the hand of the user. For example, a watch, strap or the like attached to an arm of the user may be used as the pointing element.

Also, instead of the image of the first hand used as a display object, a face photo or a full-body photo of the user that is registered in advance and stored in the storage unit 122 may be used.

In the embodiment, the position or shape of the hand of the user is determined based on the picked-up image picked up by the camera 61. As another example, a wearable terminal with a sensor such as an acceleration sensor or gyro sensor is mounted on a hand or arm of the user, and acceleration or angular velocity detected by this wearable terminal is transmitted to the HMD 100. The HMD 100 may detect the position of the hand of the user, based on the information of acceleration or angular velocity received from the wearable terminal, and may change the display position of a display object. Also, the position of the hand of the user may be detected, based on the picked-up image picked up by the camera 61 installed in the HMD 100 and the information of acceleration or angular velocity received from the wearable terminal.

Moreover, the shape of the hand-finger of the user may be recognized, using a glove that is equipped with a sensor such as a strain sensor and monitors movements of the hand-finger utilizing this sensor.

In the embodiment, the case where the user selects a function using both hands is described. Other than this, it is possible to make processing executable, using only one of the left and right hands of the user. For example, the function display image 310 corresponding to each finger is displayed at the base of each finger on the palm. The user moves the finger corresponding to the function display image 310 of the function which the user wants to select, by bending the finger or the like. The control unit 150 detects this movement of the finger based on the picked-up image picked up by the camera 61 and determines the selected finger. The control unit 150 then changes the color or display position of the finger determined as selected. If the finger determined as selected by the HMD 100 is correct, the user carries out the action of closing the open hand (in the form of "rock") and thus confirms the selection operation.

In the embodiment, the case where the hand-finger images 305, 306 showing the shapes of pointing elements are displayed as display objects is described. However, the position of a pointing element may be shown by a pointer or the like. For example, when a pointing element is detected from the picked-up image picked up by the camera 61, a pointer is displayed at the position in the display area DA corresponding to the detection position of the pointing element on the picked-up image. Also, an image showing the detection position of the pointing element on the picked-up image may be displayed as an auxiliary image.

The hand set as the first hand and the hand set as the second hand can be switched during the use.

For example, if it is determined from the picked-up image picked up by the camera 61 that the right hand is closer to the camera 61 (the left hand is farther than the right hand), the control unit 150 sets the left hand as the first hand and sets the right hand as the second hand. The control unit 150 causes the function display image 310 to be displayed corresponding to the fingers in the hand-finger image 305 of the left hand set as the first hand.

Also, based on the picked-up image picked up successively by the camera 61, the control unit 150 determines the distance between the left and right hands and the camera 61 at a predetermined interval. If it is determined that the left hand is closer to the camera 61 (the right hand is farther than the left hand), the control unit 150 changes the setting of the first hand and the second hand. The control unit 150 sets the right hand as the first hand and sets the left hand as the second hand. The control unit 150 then causes the function display images 310 to be displayed corresponding to the fingers in the hand-finger image 305 of the right hand, instead of causing the function display images 310 to be displayed corresponding to the fingers in the hand-finger image 305 of the left hand.

In the embodiment, the case where the left and right hands of the user are used as the pointing element and the sub-pointing element is described. However, the pointing element is not limited to a hand of the user. For example, a stick-like object which branches into a plurality of parts at its distal end may be used as the pointing element. In this case, the shape and color of the object used as the pointing element should be registered in the storage unit 122 as information of the pointing element.

As the color of the hand-finger images 305, 306 or the function display image 310, a complementary color of the color of an object that exists in the external field and overlaps the hand-finger images 305, 306 or the function display image 310 may be displayed.

For example, when causing the hand-finger images 305, 306 or the function display image 310 to be displayed in the display area DA, the control unit 150 determines the color of an area overlapping the hand-finger images 305, 306 or the function display image 310 (if a plurality of colors is included, the color of the largest area), based on the picked-up image picked up by the camera 61. The control unit 150 processes the hand-finger images 305, 306 or the function display image 310 into a complementary color of the determined color, and causes the processed image in the display area DA.

Also, when causing the hand-finger images 305, 306 or the function display image 310 to be displayed in the display area DA, the control unit 150 may add a contour line 307 of the hand-finger images 305, 306 or the function display image 310 to these images. For example, two types are prepared in advance as the setting of the width of a contour line 307 added to the hand-finger images 305, 306 or the function display image 310. If the transmittance of the right electronic shade 227 and the left electronic shade 247 is set to a higher value than a preset threshold, the control unit 150 adds a contour line 307 with a narrow width to the hand-finger images 305, 306 or the function display image 310. Meanwhile, if the transmittance of the right electronic shade 227 and the left electronic shade 247 is lower than the preset threshold, the control unit 150 adds a contour line 307 with a broad width to the hand-finger images 305, 306 or the function display image 310.

The color and the width of the contour lines of the hand-finger images 305, 306 displayed as display objects may be changed between the first hand as the pointing element and the secondhand as the sub-pointing element. The contour line 307 of the hand-finger image 305 of the first hand may be displayed with a broad width and the contour line 307 of the hand-finger image 306 of the second hand may be displayed with a narrow width.

In the embodiment, the case where normally black liquid crystal with a transmittance of external light of 100% in the state where no voltage is supplied and a transmittance of external light of 0% (blocked) in the state where the supplied voltage is at its maximum is used as the right electronic shade 227 and the left electronic shade 247 is described. However, as the liquid crystal used for the right electronic shade 227 and the left electronic shade 247, normally white liquid crystal with a transmittance of external light of 0% in the state where no voltage is supplied and a transmittance of external light of 100% in the state where the supplied voltage is at its maximum may be used.

In the embodiment, the configuration in which the control device 10 is wired to the image display unit 20 is described as an example. However, the invention is not limited to this example. A configuration in which the image display unit 20 is wirelessly connected to the control device 10 may be employed. As the wireless communication method in this case, a method illustrated as a communication method supported by the communication unit 117 may be employed, or other communication methods may be employed.

A part of the functions provided in the control device 10 may be provided in the image display unit 20. The control device 10 may be realized by a plurality of devices. For example, instead of the control device 10, a wearable device that can be attached to the body of the user, the clothing, or an accessory which the user wears, may be used. The wearable device in this case may be, for example, a watch-type device, ring-type device, laser pointer, mouse, air mouse, game controller, pen-type device, or the like.

In the embodiment, the configuration in which the image display unit 20 and the control device 10 are separate units and connected to each other via the connection cable 40 is described as an example. However, the invention is not limited to this example. A configuration in which the control device 10 and the image display unit 20 are unified together and mounted on the head of the user may be employed.

The invention can also be applied to a display device which does not carry out processing of AR display, MR (mixed reality) display, or VR (virtual reality) display. In AR display, an image is displayed as superimposed on a real space, and a picked-up image of the real space is combined with a virtual image. In VR display, a virtual image is displayed. As a matter of course, for example, a display device which displays video data or analog video signals inputted from outside is included as an application target of the invention.

Instead of the image display unit 20, for example, other forms of image display units such as an image display unit worn like a hat may be employed. Any image display unit having a display unit which displays an image corresponding to the left eye LE of the user and a display unit which displays an image corresponding to the right eye RE of the user may be employed. Also, the display device according to the invention may be configured, for example, as a head-mounted display installed in a vehicle such as an automobile or aircraft. The display device may also be configured, for example, as a head-mounted display built in body protection equipment such as a helmet. In this case, a part for deciding a position on the body of the user and a part positioned to that part can be used as wearing parts.

As the optical system for guiding image light to the eyes of the user, the configuration in which a virtual image is formed at a part of the right light guide plate 26 and the left light guide plate 28 by the half mirrors 261, 281 is described as an example. However, the invention is not limited to this example. An image may be displayed in a display range having an area covering the entire surface or a majority of the surface of the right light guide plate 26 and the left light guide plate 28. In this case, the operation of changing the display position of the image may include processing to reduce the image.

The optical elements in the invention are not limited to the right light guide plate 26 and the left light guide plate 28 having the half mirrors 261, 281. Any optical component that causes image light to become incident on the eyes of the user can be used. Specifically, a diffraction grating, prism, or holographic display unit may be used.

At least a part of the respective functional blocks shown in FIGS. 4, 5 and the like may be realized by hardware or may be realized by the collaboration of hardware and software, and not limited to the configuration in which independent hardware resources are arranged as illustrated. The program executed by the control unit 150 may be stored in the non-volatile storage unit 121 or another storage device (not illustrated) in the control device 10. Also, a program stored in an external device may be acquired via the communication unit 117 or the external connector 184 and then executed. Of the configuration formed in the control device 10, the control unit 110 may be formed as a user interface (UI). Also, the configuration formed in the control device 10 may be formed in a duplicative manner in the image display unit 20. For example, a processor similar to the main processor 140 may be arranged in the image display unit 20. The main processor 140 provided in the control device 10 and the processor of the image display unit 20 may be configured to execute separate functions.

The entire disclosure of Japanese Patent Application No. 2017-035981, filed Feb. 28, 2017 is expressly incorporated by reference herein.

What is claimed is:

1. A head-mounted display device for use with a head of a user, the head-mounted display device comprising:
    an image display that is mounted on the head of the user and displays an image;
    a camera that picks up a picked-up image from an external scene;
    a processor and/or circuit configured to:
        detect a pointing element based on the picked-up image picked up by the camera;
        cause the image display to display a display object corresponding to a position or a shape of the detected pointing element in the image, the display object being superimposed over the external scene that includes the detected pointing element, the display object being a contour line constituting a part or an entirety of a contour of the detected pointing element;
        cause the image display to display a functional display image, the functional display image is the image indicating a function that executes an application; and
        change a width of the contour line in the image display.

2. The head-mounted display device according to claim 1, wherein
    the image display displays the image as superimposed on the external scene visually recognized by the user,
    the camera picks up an image over a range including at least a part of the external scene visually recognized by the user, and
    the processor and/or circuit is configured to:
        cause the display object to be displayed at a position corresponding to a position where the user visually recognizes the detected pointing element in the external scene.

3. The head-mounted display device according to claim 1, wherein
    the image display is configured to transmit an external light and is configured to adjust a transmittance of the external light transmitted through the image display, and
    the processor and/or circuit is configured to:
        switch between display and non-display of the display object, based on the adjusted transmittance of the external light.

4. The head-mounted display device according to claim 1, wherein
    the processor and/or circuit is configured to:
        switch between display and non-display of the display object, based on a size of the image displayed by the image display.

5. The head-mounted display device according to claim 1, wherein
    the processor and/or circuit is configured to:
        detect a sub-pointing element that is different from the detected pointing element, based on the picked-up image that is picked up by the camera.

6. The head-mounted display device according to claim 5, wherein
    the processor and/or circuit is further configured to:
        determine a selected site based on a pointed position of the sub-pointing element on the detected pointing element or the detected display object, and
        execute the application based on the selected site.

7. The head-mounted display device according to claim 1, wherein the functional display image is displayed as superimposed on the detected pointing element and the display object.

8. The head-mounted display device according to claim 1, wherein the display object is an image of a hand of the user picked up by the camera.

9. The head-mounted display device according to claim 6, wherein the processor and/or circuit is configured to execute: (A) an operation mode in which the processing corresponding to the site on the detected pointing element or the detected display object selected by the operation is executed, and (B) a setting mode in which the processing corresponding to the site on the detected pointing element or the display object is set.

10. A non-transitory computer readable medium storing a program for use with a head-mounted display device having: (i) an image display which is mounted on a head of a user and that displays an image, (ii) a camera, and (iii) a processor and/or circuit, that the program causing the processor and/or circuit to execute steps comprising:
    detecting a pointing element based on the picked-up image picked up by the camera;
    causing the image display to display a display object corresponding to a position or a shape of the detected pointing element in the image, the display object being superimposed over the picked-up image of the external scene that includes the detected pointing element, the display object being a contour line constituting a part or an entirety of a contour of the detected pointing element;
    causing the image display to display a functional display image, the functional display image indicating a function that executes an application; and
    changing a width of the contour line in the image display.

11. A method for controlling a head-mounted display device that includes an image display which is mounted on a head of a user and displays an image, a camera, and a processor and/or circuit, the method comprising:
    detecting a pointing element based on a picked-up image that is picked up by the camera;
    causing the image display to display a display object indicating at least one of position or shape of the detected pointing element in the image, the display object being superimposed over the picked-up image of the external scene that includes the detected pointing element, the display object being a contour line constituting a part or an entirety of a contour of the detected pointing element;
    causing the image display to display a functional display image, the functional display image indicating a function that executes an application; and
    changing a width of the contour line in the image display.

12. The head-mounted display device according to claim 1, wherein the functional display image is displayed around the detected pointing element or the display object.

13. A head-mounted display device for use with a head of a user, the head-mounted display device comprising:
- an image display that is mounted on the head of the user and displays an image;
- a camera that picks up a picked-up image from an external scene;
- a processor and/or circuit configured to:
  - detect a pointing element based on the picked-up image picked up by the camera;
  - detect a sub-pointing element that is different from the detected pointing element form on the picked-up image;
  - cause the image display to display a display object corresponding to a position or a shape of the detected pointing element in the image, the display object being superimposed over the external scene that includes the detected pointing element, the display object being a first contour line that is a part or an entirety of a contour of the detected pointing element;
  - cause the image display to display a functional display image, the functional display image is the image indicating a function that executes an application;
  - cause the image display to display a sub-display object, the sub-display object is a second contour line that is a part or entirety of a contour of the sub-pointing element; and
  - cause the image display to display a width of the first contour line with different from a width of the second contour line.

* * * * *